US009872170B2

United States Patent
Kim et al.

(10) Patent No.: US 9,872,170 B2
(45) Date of Patent: *Jan. 16, 2018

(54) METHOD FOR PROVIDING LOCAL CSG AND CONTROLLING ACCESS IN SERVER IN CHARGE OF CONTROL PLANE IN MOBILE COMMUNICATION NETWORK

(71) Applicant: LG ELECTRONICS INC., Seoul (KR)

(72) Inventors: Hyunsook Kim, Anyang-si (KR); Laeyoung Kim, Anyang-si (KR); Taehyeon Kim, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 16 days.

This patent is subject to a terminal disclaimer.

(21) Appl. No.: 15/059,938

(22) Filed: Mar. 3, 2016

(65) Prior Publication Data

US 2016/0192177 A1    Jun. 30, 2016

Related U.S. Application Data

(63) Continuation of application No. 14/006,413, filed as application No. PCT/KR2012/001158 on Feb. 16, 2012, now Pat. No. 9,301,105.

(30) Foreign Application Priority Data

Dec. 23, 2011    (KR) .................. 10-2011-0141453

(51) Int. Cl.
*H04W 72/00*    (2009.01)
*H04W 8/18*    (2009.01)
(Continued)

(52) U.S. Cl.
CPC ........... *H04W 8/186* (2013.01); *H04M 15/66* (2013.01); *H04W 4/08* (2013.01); *H04W 48/08* (2013.01); *H04W 72/10* (2013.01)

(58) Field of Classification Search
CPC ....... H04W 48/16; H04W 4/08; H04W 8/186; H04W 48/08; H04W 12/06; H04W 36/08;
(Continued)

(56) References Cited

U.S. PATENT DOCUMENTS

| 9,301,105 B2 * | 3/2016 | Kim | ........................ H04W 4/08 |
| 2008/0220782 A1 * | 9/2008 | Wang | ..................... H04W 4/08 455/436 |

(Continued)

FOREIGN PATENT DOCUMENTS

| KR | 10-2010-0120259 A | 11/2010 |
| KR | 10-2011-0003228 A | 1/2011 |
| KR | 10-2011-0012126 A | 2/2011 |

OTHER PUBLICATIONS

ETSI TS 123 401 V9.2.0 (Oct. 2009) LTE; General Packet Radio Service (GPRS) enhancements for Evolved Universal Terrestrial Radio Access Network(E-UTRAN) access (3GPP TS 23.401 version 9.2.0 Release 9)—pp. 246.

*Primary Examiner* — Nimesh Patel
(74) *Attorney, Agent, or Firm* — Birch, Stewart, Kolasch & Birch, LLP

(57) ABSTRACT

A method of controlling an access, which is controlled by a Mobility Management Entity (MME) of a control plane in a visited network; and the MME therefore are discussed. The method according to one embodiment includes receiving an access request message or an update request message requested by a roaming user equipment (UE) from a Home (e)Node B; and determining Closed Subscriber Group (CSG) information among first CSG information and second CSG information based on predefined priority information (Continued)

when the first CSG information conflicts with the second CSG information. The predefined priority information indicates that the first CSG information takes precedence over the second CSG information. The method further includes transmitting an accept message based on the determined CSG information via the Home (e)Node B. The first CSG information is CSG-related information defined in a home network and the second CSG information is CSG-related information in the visited network.

10 Claims, 13 Drawing Sheets

Related U.S. Application Data

(60) Provisional application No. 61/469,106, filed on Mar. 30, 2011.

(51) Int. Cl.
  *H04W 4/08* (2009.01)
  *H04M 15/00* (2006.01)
  *H04W 48/08* (2009.01)
  *H04W 72/10* (2009.01)

(58) Field of Classification Search
  CPC ... H04W 36/14; H04W 48/04; H04W 60/005; H04W 88/02; H04W 8/205; H04W 36/0083; H04W 40/36; H04W 60/04; H04W 8/24; H04W 84/045; H04W 48/02; H04W 60/00; H04W 76/007; H04W 12/08; H04W 4/06; H04W 76/027; H04W 88/08; H04W 8/16; H04W 48/20; H04W 72/0426; H04W 36/0033; H04W 36/0022; H04W 48/18; H04W 8/183; H04W 8/245; H04W 76/02; H04W 72/10; H04W 76/002; H04W 16/08; H04W 28/02; H04L 63/104
  See application file for complete search history.

(56) References Cited

U.S. PATENT DOCUMENTS

| | | |
|---|---|---|
| 2009/0232019 A1 | 9/2009 | Gupta et al. |
| 2009/0257353 A1 | 10/2009 | Song et al. |
| 2010/0159899 A1 | 6/2010 | Horn et al. |
| 2011/0045826 A1 | 2/2011 | Kim et al. |
| 2012/0189016 A1 | 7/2012 | Bakker et al. |

* cited by examiner

FIG. 3
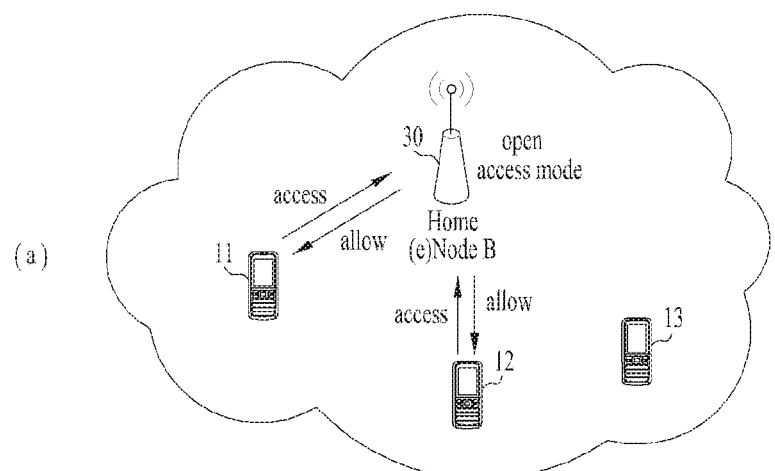
(a)
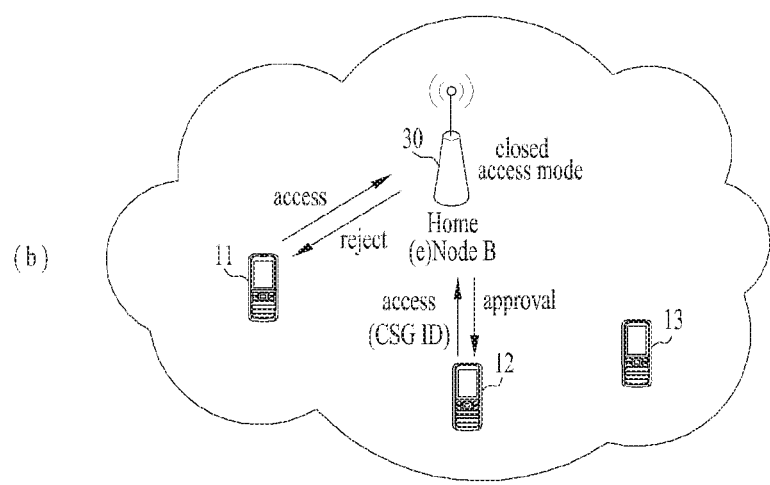
(b)
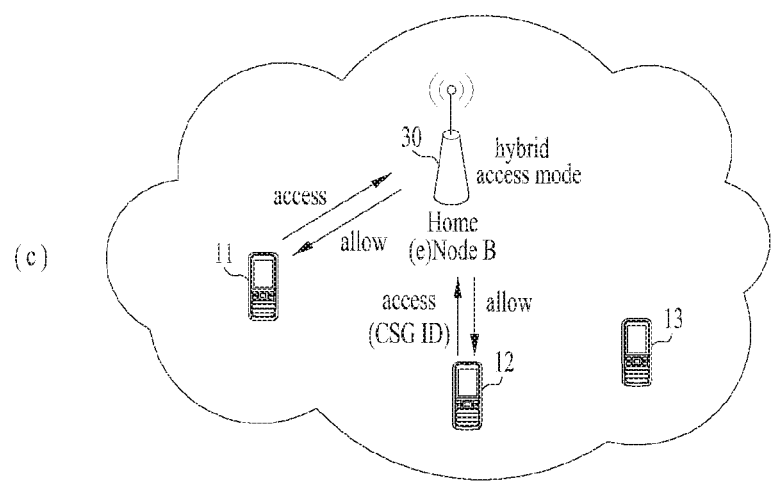
(c)

FIG. 11
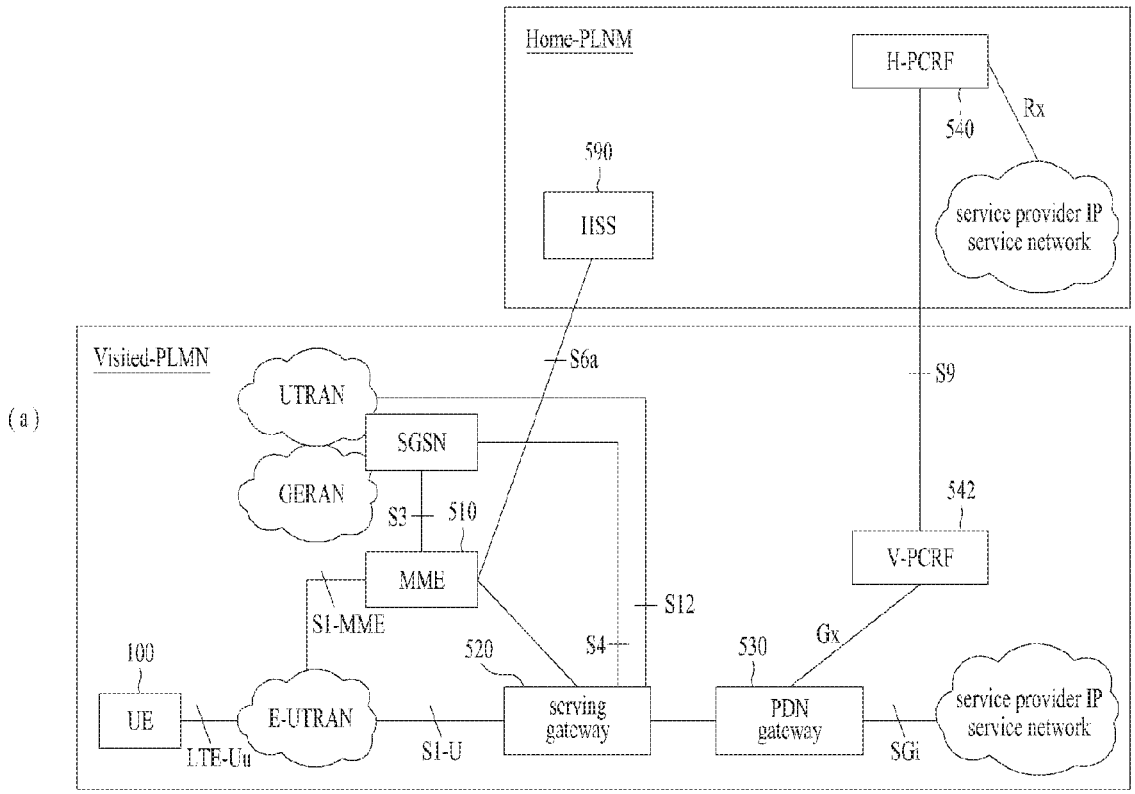
(a)
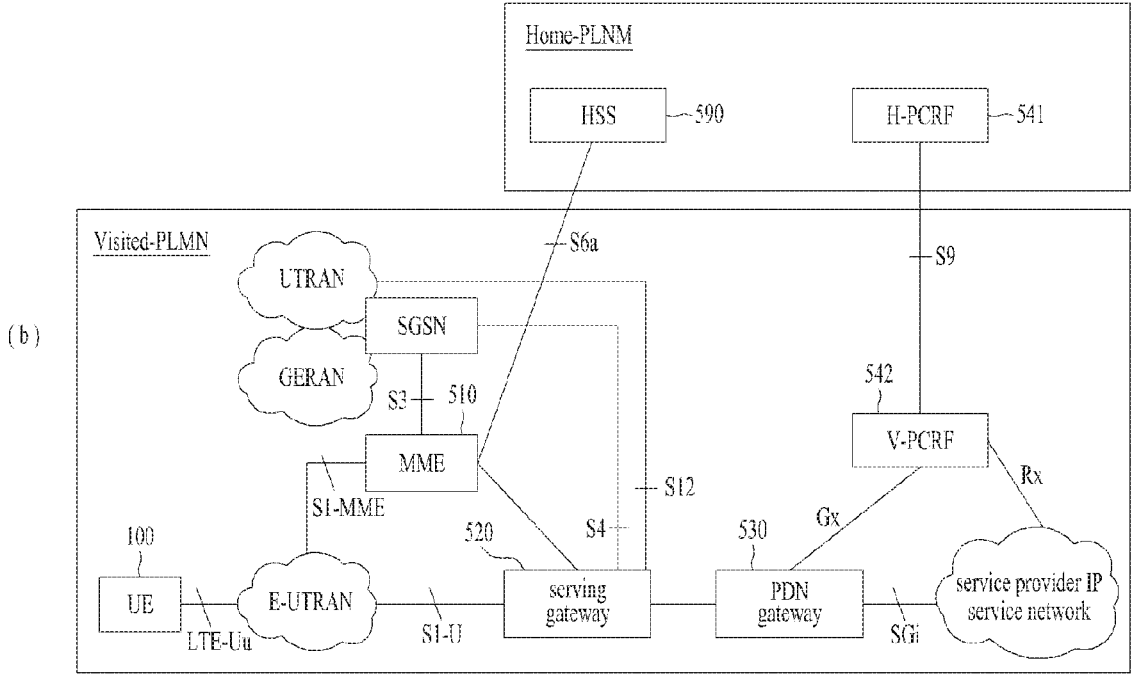
(b)

METHOD FOR PROVIDING LOCAL CSG AND CONTROLLING ACCESS IN SERVER IN CHARGE OF CONTROL PLANE IN MOBILE COMMUNICATION NETWORK

CROSS-REFERENCE TO RELATED APPLICATIONS

This application is a Continuation of co-pending U.S. patent application Ser. No. 14/006,413 filed on Sep. 20, 2013, which is filed as the National Phase of PCT/KR2012/001158 filed on Feb. 16, 2012, which claims the benefit under 35 U.S.C. §119(e) to U.S. Provisional Application No. 61/469,106 filed on Mar. 30, 2011, and under 35 U.S.C. §119(a) to Korean Patent Application No. 10-2011-0141453 filed on Dec. 23, 2011, all of which are hereby expressly incorporated by reference into the present application.

BACKGROUND OF THE INVENTION

Field of the Invention

The present invention relates to a mobile communication system, and more particularly, to a Home (e)Node B system in a mobile communication system.

Discussion of the Related Art

In order to deal with many forums related to a fourth generation mobile communication and a new technology, 3GPP establishing a technology standard of a third generation mobile communication system has started to conduct a study on LTE/SAE (Long Term Evolution/System Architecture Evolution) technology by the end of 2004 in a bid to optimize and enhance performance of 3GPP technologies.

The SAE proceeded centering on 3GPP SA WG2 is a study on a network technology having a purpose of determining a network structure in a manner of juggling an LTE job of 3GPP TSG RAN and the purpose of supporting mobility between heterogeneous networks. Currently, the SAE is one of important standardization issues of 3GPP. This is a job to develop a 3GPP system to a system supporting various radio access technologies based on an IR The job has been progressed to achieve a target of an optimized packet-based system minimizing a transmission delay with a more enhanced data transmission capability.

An SAE upper level reference model defined by the 3GPP SA WG2 includes a non-roaming case and roaming cases of various scenarios. Detail contents may refer to 3GPP standard document TS 23.401 and TS 23.402. A diagram of a network structure in FIG. 1 corresponds to a simple reconstruction of the SAE upper level reference model.

FIG. 1 is a diagram of a structure of an evolved mobile communication network.

One of main characteristics of the network structure in FIG. 1 corresponds that the structure is based on a 2 Tier Model, i.e., an eNode B of Evolved UTRAN and a Gateway of a Core Network. Although it is not perfectly matched to each other, the eNode B may perform a function similar to the function of RNC of a Node B of a legacy UMTS system and the Gateway may perform a function similar to the function of SGSN/GGSN of a legacy system.

Another main characteristic of the network structure is that a Control Plane and a User Plane between an Access network and the Core Network are exchanged by an interface different from each other. In the legacy UMTS system, there exist one interface, i.e., Iu, between RNC and SGSN. On the other hand, since an MME (Mobility Management Entity) in charge of processing a control signal has a structure separated from the GW (Gateway), two types of interface, i.e., S1-MME and S1-U, can be used, respectively.

FIG. 2 is a diagram of an (e)Node B and a Home (e)Node B.

An attempt to increase cell capacity in order to support such a high-capacity service as multimedia content, streaming, and the like and a bidirectional service in the third generation or the fourth generation mobile communication system continues.

In particular, since various transmission techniques of high-capacity are required according to a development of a communication and dissemination of a multimedia technology, it is able to allocate more frequency resources to increase radio capacity. Yet, since the frequency resource is limited, there exist a limit for allocating the limited frequency resource to a plurality of users.

In order to increase the cell capacity, an approach of using a high frequency band and the approach of reducing a cell radius have been tried. If such a cell of a small radius as a pico cell and the like are applied, since it is able to use a frequency band higher than the frequency band used in a legacy cellular system, more information can be delivered. Yet, since more base stations are necessary to be installed in an identical area, cost may dramatically increase instead.

As mentioned in the foregoing description, recently, a femto base station such as the Home (e)Node B is proposed among the approaches of increasing the cell capacity by using a small cell.

The (e)Node B 20 depicted in FIG. 2 corresponds to a macro base station and the Home (e)Node B 30 may correspond to the femto base station. It is intended that the present specification is explained based on a terminology of 3GPP and the (e)Node B 20 is used when a Node B and an eNode B are mentioned together. And, the Home (e)Node B is used when a Home Node B and a Home eNode B are mentioned together.

Meanwhile, a cell of the Home (e)Node B 30 includes an open access mode, a closed access mode, and a hybrid access mode according to an access permit policy.

In case of the open access mode, the Home (e)Node B 30 cell provides a service to serviceable user equipments without a limit.

In case of the closed access mode, accessing the Home (e)Node B cell is allowed only for a user equipment allowed to the corresponding Home (e)Node B 30 cell.

Regarding the closed access mode, UMTS/EPS of 3GPP standard proposes to support the cell of the Home (e)Mode B 30 in a closed subscriber group (CSG) unit. In particular, one closed subscriber group (CSG) can be configured with at least one Home (e)Node B. Authority for use for the cell of the Home (e)Node B is provided to the user equipment as well in the closed subscriber group (CSG) unit. In this case, the user equipment can include at least one available closed subscriber group (CSG) and can possesses time information allowed according to each of the closed subscriber groups. This is called an allowed CSG list. The allowed CSG list is stored in the user equipment and such a network entity as MME, SGSN, MSC, HSS, HLR, and the like.

FIG. 3 is a diagram of an example of an operation mode of a Home (e)Node B.

The aforementioned and depicted femto base station, e.g., the Home (e)Node B 30 can operate in three modes, i.e., the open access mode of FIG. 3(*a*), the closed access mode of FIG. 3(*b*), and the hybrid access mode of FIG. 3(*c*).

First of all, referring to FIG. 3(*a*), an example of the open access mode is displayed. As defined in the foregoing description, the open access mode indicates that all user equipments are able to access without limit for accessing the cell of the Home (e)Node B 30. Hence, as depicted in FIG. 3(*a*), access of a plurality of UEs 11/12/13 are all allowed.

Referring to FIG. 3(*b*), an example of the closed access mode is displayed. The closed access mode indicates that the Home (e)Node B 30 operates as a closed subscriber group (CSG) cell. In other word, the Home (e)Node B 30 allows an access only for an allowed user equipment. The Home (e)Node Bs 30 have a CSG identity(ies) (ID(s)) capable of providing a service. Each user receives an approval of use according to the CSG.

Referring to FIG. 3(*c*), an example of the hybrid access mode is displayed.

Although the hybrid access mode operates as a CSG cell providing a service to a closed subscriber group (CSG), the hybrid access mode allows a user equipment of a non-closed subscriber group to access. For instance, as depicted in FIG. 3(*c*), although a first UE 11 is not a member of the CSG; the first UE can access the Home (e)Node B 30.

SUMMARY OF THE INVENTION

In the aforementioned prior art, in case that a UE roamed to a visited network, if a Home (e)Node B in the visited network operates in the closed access mode or the hybrid access mode, a specific technology to process an access of the UE in an environment not capable of receiving CSG subscriber information from a CSG server existing in a home network is not suggested yet.

Yet, accessing the Home (e)Node B by the UE in the visited network is a method of reducing an overhead of a macro base station, i.e., an (e)Node B. And, since the access of the UE should be preferentially processed to provide a specific service, it is necessary to propose a technology to implement the specific service.

Hence, an object of the present specification is to propose the technology or the method.

To achieve these and other advantages and in accordance with the purpose of the present invention, as embodied and broadly described, the present specification provides a method of accessing, which is accessed by a user equipment roamed to a visited network. The method includes the steps of receiving at least one of a local CSG-related information defined in the visited network and a CSG-related information in a home network, adding at least one of an attach request message to access a Home (e)node B operating in a Closed Subscriber Group (CSG) mode or a hybrid access mode, the received local CSG-related information in a TAU request message to perform a Tracking Area Update (TAU), and the CSG-related information defined in the home network, transmitting the attach request message or the TAU request message to the Home (e)Node B, and receiving an accept message or a reject message for an attach request or a TAU request from the Home (e)Node B.

The step of receiving at least one of the local CSG-related information defined in the visited network and the CSG-related information in the home network can further receive an information on priority between the local CSG-related information and the CSG-related information.

The information on priority can be transmitted in a manner of being contained in the attach request message or the TAU request message.

The information on priority can further include at least one of a first element indicating priority between the local CSG-related information and the CSG-related information and a second element indicating whether the priority is static or whether the priority can be modified into dynamic priority.

If the attach or the TAU is allowed, the information on priority can further include at least one of an information on a level to be allowed and an information on a CSG membership in case of being allowed.

Meanwhile, the present specification provides a method of controlling an access, which is controlled by a server in charge of a control plane in a visited network. The method of controlling an access includes the steps of receiving an access request message or an update request message requested by a roaming user equipment from a Home (e)Node B by the server in charge wherein the Home (e)Node B operates in a Closed Subscriber Group (CSG) mode or a hybrid access mode and wherein the access request message or the update request message comprises at least one of a local CSG-related information defined in the visited network or a CSG-related information in a home network, evaluating whether there is discord between the CSG-related information in a subscriber information of the roaming user equipment, which is obtained from a subscriber information server situated at the home network of the roaming user equipment, and the local CSG-related information defined in the visited network, if there is the discord, performing an access control using a predefined priority information by the server in charge, and transmitting an accept message or a reject message for the access request message or the update request message to the Home (e)Node B by the server in charge according to the access control.

If there is the discord, the priority information can include at least one of a first element configured to give a priority to a prescribed one among a CSG information included in the subscriber information and a CSG information defined in the visited network and a second element indicating whether a reference of the access control is static or whether the reference of the access control can be modified into a dynamic reference.

If an access is allowed as a result of the access control, the priority information can further include at least one of an information on a level to be allowed and an information on a CSG membership in case of being allowed.

The CSG-related information or the local CSG-related information can further include at least one of a CSG ID and an expiration time information.

The CSG-related information or the local CSG-related information can further include the priority information.

The CSG-related information or the local CSG-related information can include at least one selected from the group consisting of an information on whether a CSG service is allowed in the visited network, the CSG-related information allowed in the visited network, an information on a level of the CSG service allowed in the visited network, the priority information for a case of the discord.

The priority information can be obtained from the server in the visited network storing the local CSG information.

The priority information may be stored in advance in the server in charge.

Meanwhile, to further achieve these and other advantages and in accordance with the purpose of the present invention, the present specification provides a user equipment, which roamed to a visited network. The user equipment includes a receiving unit configured to receive at least one of a local CSG-related information defined in the visited network and a CSG-related information in a home network, a control unit configured to add at least one of an attach request message to access a Home (e)node B operating in a Closed Subscriber Group (CSG) mode or a hybrid access mode, the received local CSG-related information in a TAU request message to perform a Tracking Area Update (TAU), and the CSG-related information defined in the home network, and a transmitting unit configured to transmit the attach request message or the TAU request message to the Home (e)Node B, wherein the receiving unit is configured to receive an accept message or a reject message for an attach request or a TAU request from the Home (e)Node B.

According to one embodiment of the present specification, a CSG service can be efficiently provided to a roaming UE in a visited network.

Hence, it is able to reduce an overhead of a macro base station, i.e., an (e)Node B in a manner of enabling the roaming UE to access a Home (e)Node B in the visited network.

And, unnecessary handover procedure occurred due to not capable of accessing the Home (e)Node B where the roaming UE operates as a CSG in the visited network can be removed.

BRIEF DESCRIPTION OF THE DRAWINGS

FIG. 3 is a diagram of an example of operation mode of a Home (e)Node B;

FIG. 11 is a diagram of an interface in a scenario of which a data of a user plane stops over in a home network in case that a UE intends to continuously use a service of a service provider in the home network although the UE has roamed to a visited network;

DETAILED DESCRIPTION OF THE INVENTION

Figure 1:
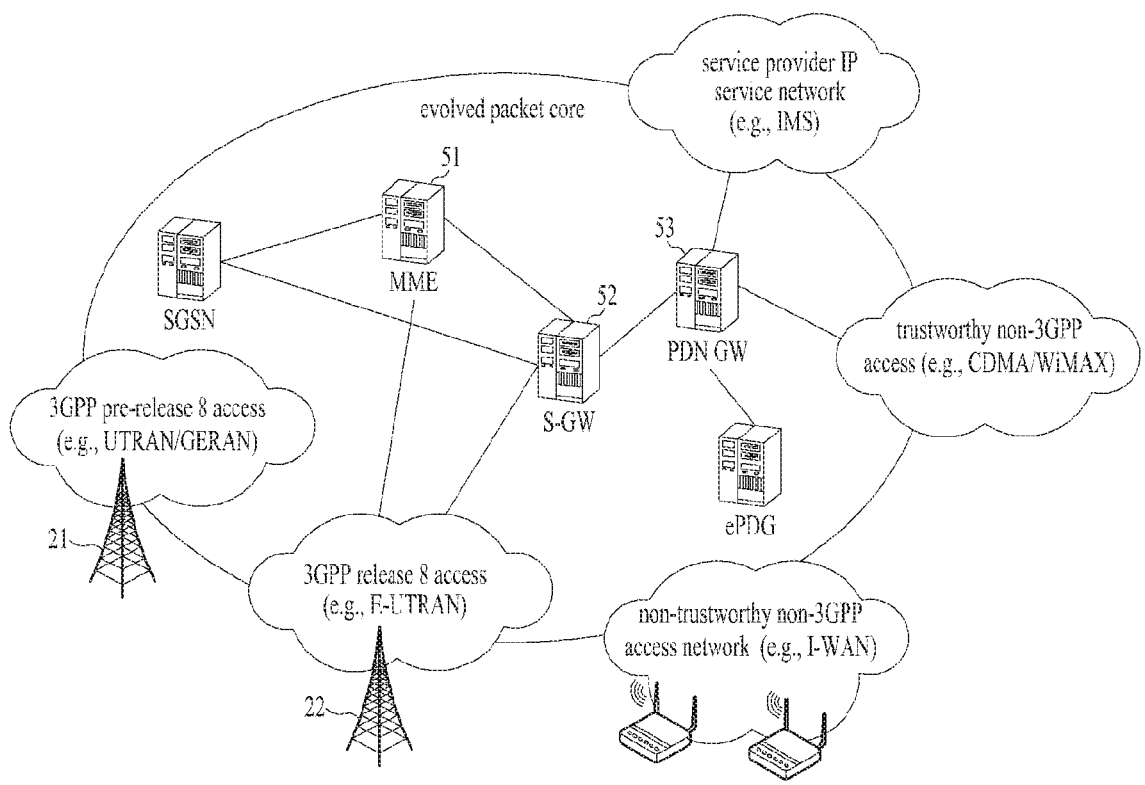
FIG. 1 is a diagram of a structure of an evolved mobile communication network.
Figure 2:
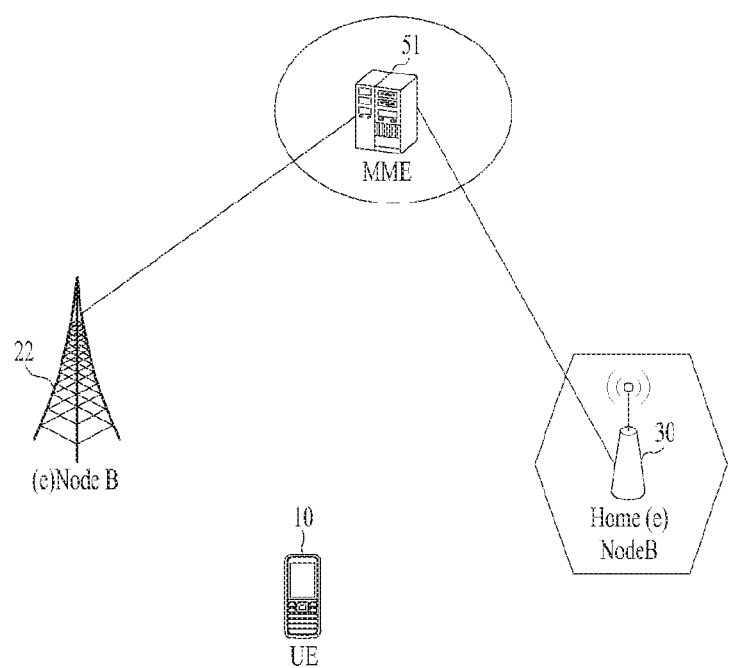
FIG. 2 is a diagram of an (e)Node B and a Home (e)Node B.

The present invention is applied to a Home (e)Node B system. In this case, the Home (e)Node B indicates a Home Node B and a Home eNode B. Yet, the present invention may be non-limited to this and can be applied to all communication systems and methods to which a technical idea of the present invention is applicable.

The technical terminologies used in the present specification are used only to describe a specific embodiment(s) and have no intention to restrict the present invention. The technical terminologies used in the present specification should be construed not as excessively inclusive meanings or excessively reduced meanings but as meanings generally understood by those having ordinary skill in the technical field, to which the present invention pertains, unless defined as other meanings especially in the present specification. If the technical terminologies used in the present specification fail in correctly representing the idea of the present invention, they should be substituted with technical terminologies correctly understandably by those having ordinary skill in the technical field to which the present invention pertains. Moreover, general terminologies used by the present invention may be construed not as the excessively reduced meanings but as the meanings defined in dictionaries or the sequence of the context.

And, the singular number representation used in the present specification may include the plural number representation unless mentioned clearly and differently in context. In the present application, such a terminology as 'configured', 'include' and the like should be construed not as necessarily including various components or steps written in the present specification but as including the components or steps in part or further including additional components or steps.

Moreover, a terminology, each of which includes such an ordinal number as $1^{st}$, $2^{nd}$ and the like, may be used to describe various components. In doing so, the various components should be non-limited by the corresponding terminologies, respectively. The terminologies are only used for the purpose of discriminating one component from other components. For instance, a $1^{st}$ component may be named a $2^{nd}$ component while coming within the scope of the appended claims and their equivalents. Similarly, the $2^{nd}$ component may be named the $1^{st}$ component.

In case that one component is mentioned as 'connected to' or 'accessing' another component, it may be connected to or access the corresponding component in direct. Yet, new component(s) may exist in between. On the other hand, in case that one component is mentioned as 'directly connected to' or 'directly accessing' another component, it should be understood that new component(s) may not exist in between.

In the following description, a preferable embodiment according to the present invention is explained in detail with reference to the attached drawings. The same reference numbers will be used throughout the drawings to refer to the same or like parts in this specification irrespective of the sign of the drawings and the overlapped explanation on the corresponding content can be omitted. And, in describing the present invention, if the detailed description of the related art is determined as making the point of the present invention unclear, it will be omitted. The accompanying drawings, which are included to provide a further understanding of the invention and are incorporated in and constitute a part of this specification, illustrate embodiments of the invention and together with the description serve to explain the principles of the invention only. While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

For clarity of explanation, the following description mainly concerns 3GPP EUTRAN/EPC, by which the technical idea of the present invention may be non-limited. In particular, since the following description mainly concerns the EUTRAN/EPC, a specific network entity mentions an MME. Yet, the specific network entity can be a different second network entity (e.g., Home (e)Node B gateway and the like) determining a paging in a broad sense. And, in the detail explanation of the present invention, although it is described on the basis of a network structure where the Home (e)Node B gateway (a node between the Home (e)Node B and a core network) is omitted, it is able to expand to use in a similar form in the network structure where the Home (e)Node B gateway exists as well.

In the following description, a terminology of terminal is used. The terminal can be called a user equipment (UE), a mobile equipment (ME), or a mobile station (MS). And, the UE may correspond to such a portable device equipped with a communication function as a cellular phone, a PDA, a smart phone, a notebook, or the like. Or, the UE may correspond to such a device not capable of being carried as a PC, a vehicle mounted device.

Definition of a Terminology

Prior to the beginning of explanation with reference to drawings, the terms used in the present specification is briefly defined to help understand the present invention.

UMTS: an abbreviation for a Universal Mobile Telecommunication System. It means a third generation mobile communication network.

EPS: an abbreviation for an Evolved Packet System. It means an efficient network structure supporting an evolved RAN in a manner of evolving a core network of legacy 3GPP system architecture and simplified a network entity to enhance efficiency of a packet network.

Node B: a base station of a UMTS network. A size of cell coverage corresponds to a macro cell.

eNode B: a base station of an EPS network. A size of cell coverage corresponds to a macro cell.

(e)Node B: a terminology indicating a Node B and an eNode B.

Home Node B: a base station of a UMTS network. A size of cell coverage corresponds to a femto cell. A Home Node B connects a 3GPP-based UE to a network of a mobile service provider via UTRAN wireless air interface.

Home eNode B: a base station of an EPS network. A size of cell coverage corresponds to a femto cell. A Home eNode B connects a 3GPP-based UE to a network of a mobile service provider via E-UTRAN wireless air interface.

Home (e)Node B: a terminology indicating a Home Node B and a Home eNode B.

Home (e)Node B gateway: a gateway plays a role of interfacing and capable of being connected to a core network in a manner of connecting to at least one Home (e)Node B.

Home (e)Node B subsystem: in case of a network structure with which a Home (e)Node B gateway is implemented together, a form for managing a wireless network in a manner of binding a Home (e)Node B and a Home (e)Node B gateway as a set. Since the Home (e)Node B subsystem and the Home (e)Node B play a role of managing the wireless network and interlocking with a core network, it is able to consider them as an assembly form. Hence, in the following description, the terms of the Home (e)Node B subsystem and the Home (e)Node B can be used in a manner of being mixed.

RAN: an abbreviation for a Radio Access Network. It is a generic term for such a 3GPP wireless access as RNC, Node B, eNode B.

HLR (Home Location Register)/HSS (Home Subscriber Server): a database indicating subscriber information in a 3GPP network.

RANAP: an abbreviation for a Radio Access Network Application Part. It means an interface between nodes (MME/SGSN/MSC) in charge of a control of a RAN and a core network.

Closed Subscriber Group (hereinafter abbreviated CSG): it indicates a specific membership group based on subscriber information to allow only for the access of a user equipment allowed to a cell of a Home (e)Node B.

Open Access Mode: it indicates that a Home (e)node B operates in the same manner of a normal cell (non-CSG cell) without a concept of a CSG In particular, it indicates that the Home (e)Node B operates like a normal (e)Node B.

Closed Access Mode: it indicates that a Home (e)Node B operates as a CSG cell. It indicates that the Home (e)Node B operates in a manner of allowing an access only for a user equipment allowed to a corresponding cell. In particular, only the user equipment having authority for specific CSG IDs supported by the Home (e)Node B can access.

Hybrid access mode: it indicates that a Home (e)Node B allows a user equipment of a non-closed subscriber to access, although the Home (e)Node B operates as a CSG cell. It is able to provide a Home (e)Node B service in a manner of allowing a user equipment having a specific CSG ID capable of supporting a corresponding cell to access. It indicates that the Home (e)Node B operates in a manner of allowing a user equipment having no CSG authority to access.

CSG cell: it is a cell of a part of PLMN. Only a member of the CSG group can access the CSG cell. To this end, the CSG cell broadcasts a CSG ID. CSG cells sharing an identical ID can be identified or managed as one group for mobility management and charging.

CSG ID: it is an ID broadcasted by the CSG cell. The CSG ID is used to ease an access of an authorized member. The CSG ID is unique only in one PLMN.

Allowed CSG list: it is a list including CSG identification information of CSGs to which a subscriber belongs. The allowed CSG list is stored in a network and a UE.

Tracking area: it is a basic unit for tracking a position of a UE 100 operating in an idle mode. In particular, it is the basic unit for a position registration of the UE. This kind of ID of a specific area is called a Tracking Area Identity (TAI). In the EPS, a user equipment can simultaneously perform the position registration in a plurality of TAs for an efficient mobility management in an idle mode of the UE. In this case, the UE manages a TAI list.

TAI LIST: according to a position shift of a UE, position information where the position registration is performed to the HSS or the HLR via the MME, in particular, it is a set of the (e)Node B or the Home (e)Node B.

PCC (policy and charging control): it indicates an operation for a policy of a service provider and charging.

PCRF (policy and charging rule function): it is a functional network element having a policy of a service provider and a charging rule to perform the PCC and plays a role of providing the policy of the service provider and the charging rule to a different node.

In the following description, the present specification is explained in detail with reference to the drawings.

Figure 4:
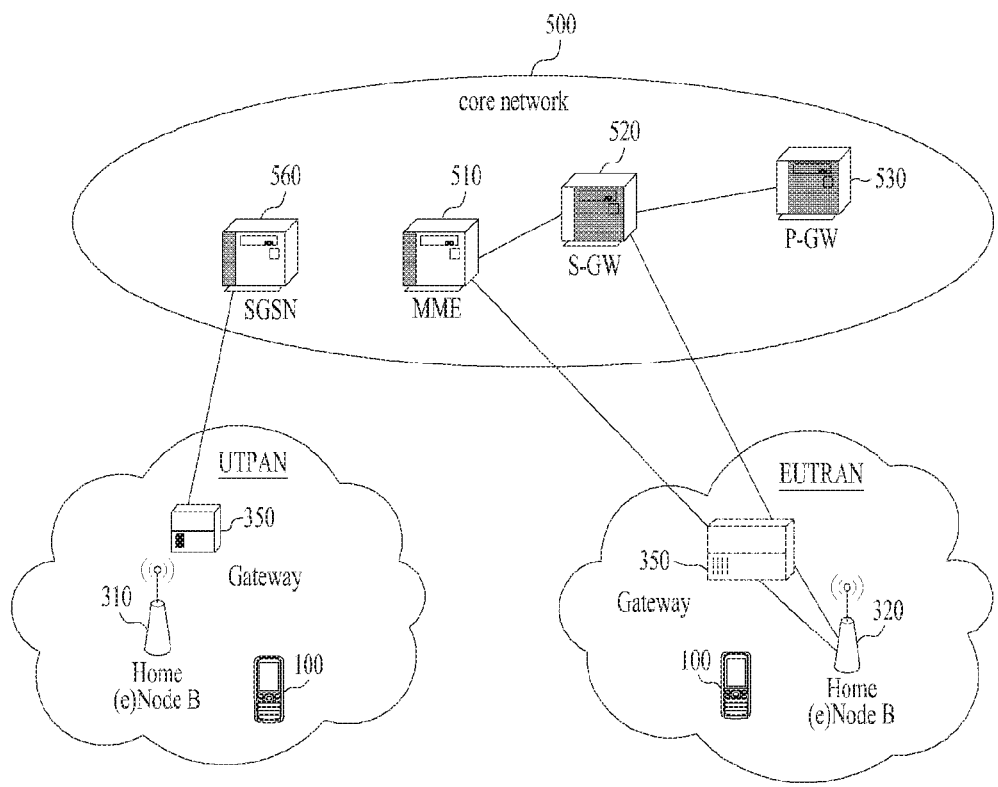
FIG. 4 is a diagram of an example of a network structure including a Home (e)Node B.

FIG. 4 is a diagram of an example of a network structure including a Home (e)Node B.

As depicted in FIG. 4(a), a core network 500 includes an MME 510, an S-GW (serving gateway) 520, an SGSN 560, and a P-GW (packet data network gateway or PDN gateway) 530. Besides, the core network 500 may further include a PCRF 540 and an HSS 590.

FIG. 4(a) indicates a Home Node B 310 of UTRAN (UMTS terrestrial radio access network) and a Home eNode B 320 of E-UTRAN (evolved-UTRAN). The Home Node B 310 of UTRAN is connected to the SGSN 560 via a gateway 350. The Home eNode B 320 is connected to the MME 510 and the S-GW 520. In this case, a control signal is delivered to the MME 510 and a user data signal is delivered to the S-GW 520. And, there may exist a gateway 350 between the Home eNode B 320 of E-UTRAN and the MME 510.

Figure 5:
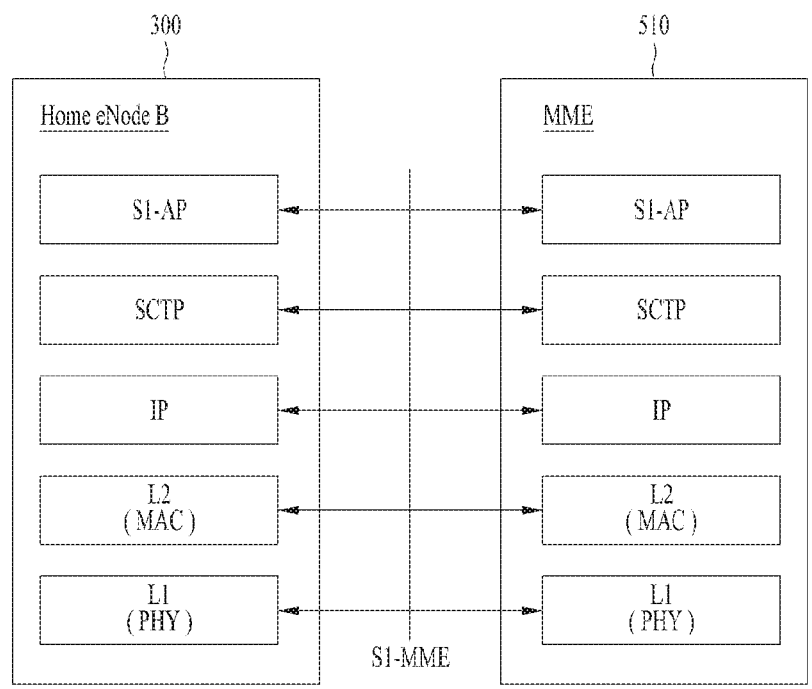
FIG. 5 is a diagram of an example of an interface between a Home (e)Node B 300 and an MME 510 depicted in FIG. 4 as a protocol stack.

FIG. 5 is a diagram of an example of an interface between a Home (e)Node B 300 and an MME 510 depicted in FIG. 4 as a protocol stack.

As depicted in FIG. 5, the Home eNode B 300 and the MME 510 include a first layer (a physical layer), a second layer (a medium access control layer), a third layer (an IP (internet protocol) layer), an SCTP (signaling control transmission protocol), an S1-AP (S1 application protocol), respectively.

The S1-AP is an application layer protocol between the Home eNode B 300 and the MME 510. The SCTP promises a delivery of a signaling message between the Home eNode B 320 and the MME 510.

Figure 6:
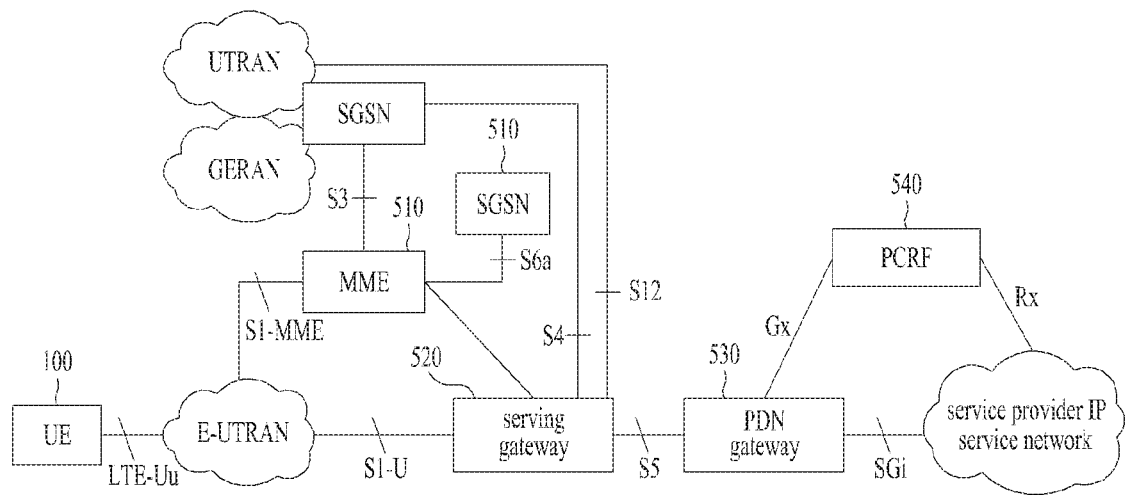
FIG. 6 is a diagram of a structure of a mobile communication network and an interface.

FIG. 6 is a diagram of a structure of a mobile communication network and an interface.

The interface is explained with reference to FIG. 6 in the following description.

S1-MME: it is the interface for a control plane protocol between E-UTRAN and the MME.

S1-U: it is the interface for a bearer user plane between E-UTRAN and the serving gateway. It is a path switched during a handover.

S3: it enables to exchange user and bearer information for mobility in a state of idle and/or active.

S4: it enables to control a 3GPP anchor function between the GPRS core and the serving gateway and enables to support mobility. And, if a tunnel is not set, it provides a user plane tunneling.

S5: it enables a user plane tunneling and management between the serving gateway and the PDN gateway. It can be used for reassigning the serving gateway when a UE moves.

S6a: it enables to transmit a subscriber and an authentication data necessary for authenticating/authorizing an evolved network system.

Gx: it is used to transmit a policy and a charging rule from PCRF to PCEF.

S12: when a tunnel is set, it is an interface between UTRAN and the serving gateway for a user plane tunneling.

SGi: it is an interface between the PDN gateway and a packet data network. The packet data network may correspond to an external public service provider, a personal packet data network, or an internal service provider packet data network.

Rx: it is an interface between AF and PCRF.

Figure 7:
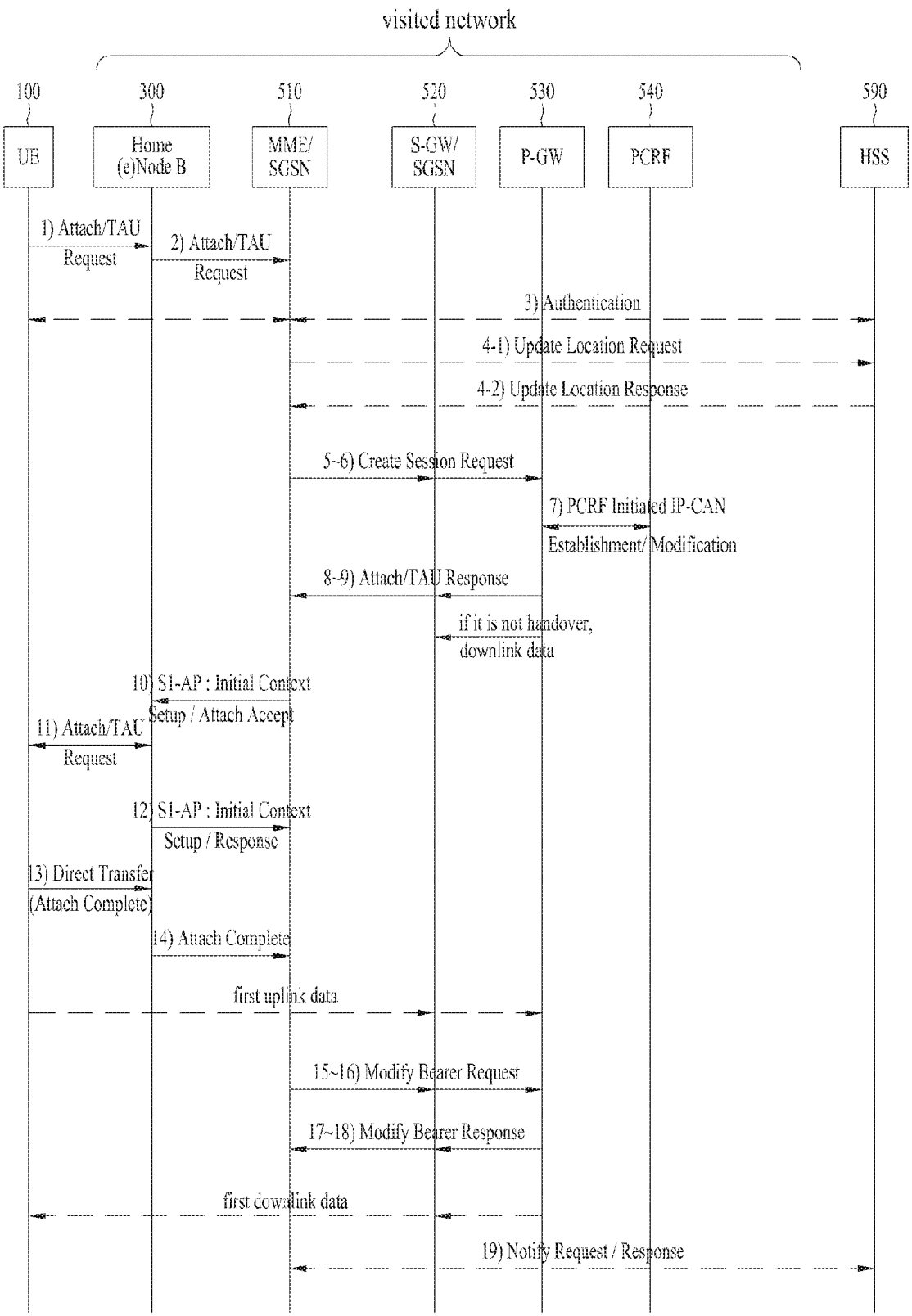
FIG. 7 is a diagram of a process that a UE is attaching, i.e., accessing a network.
Figure 8:
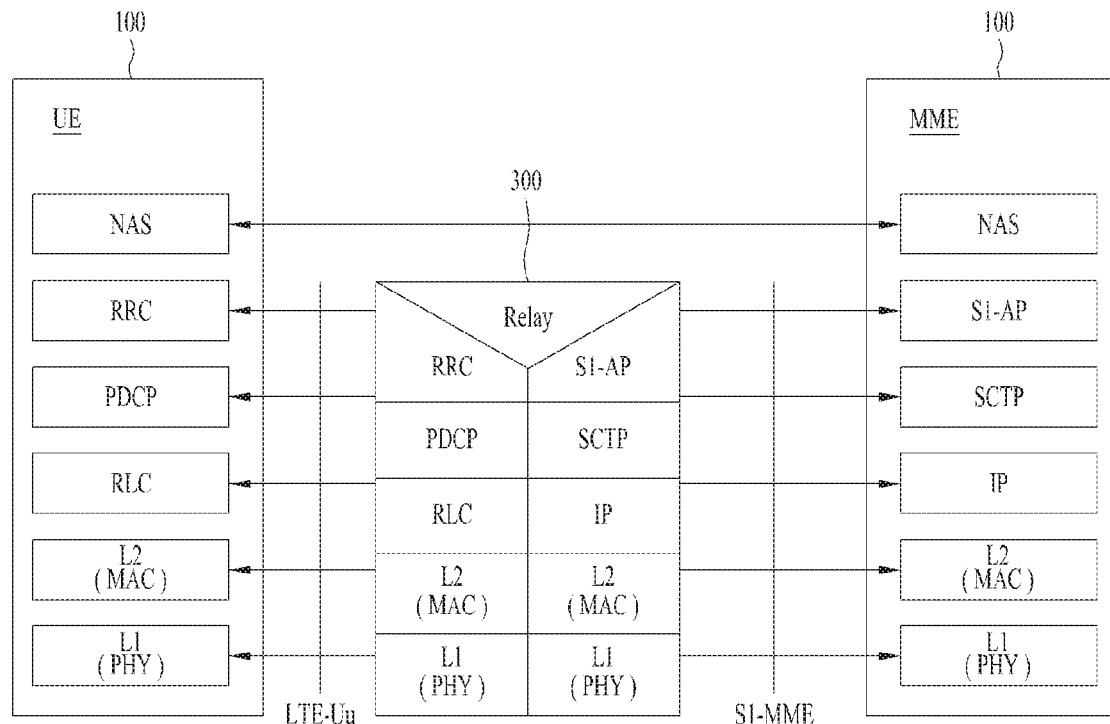
FIG. 8 is a diagram of a protocol stack between a UE 100, a Home (e)Node B 300, and an MME 510.
Figure 9:
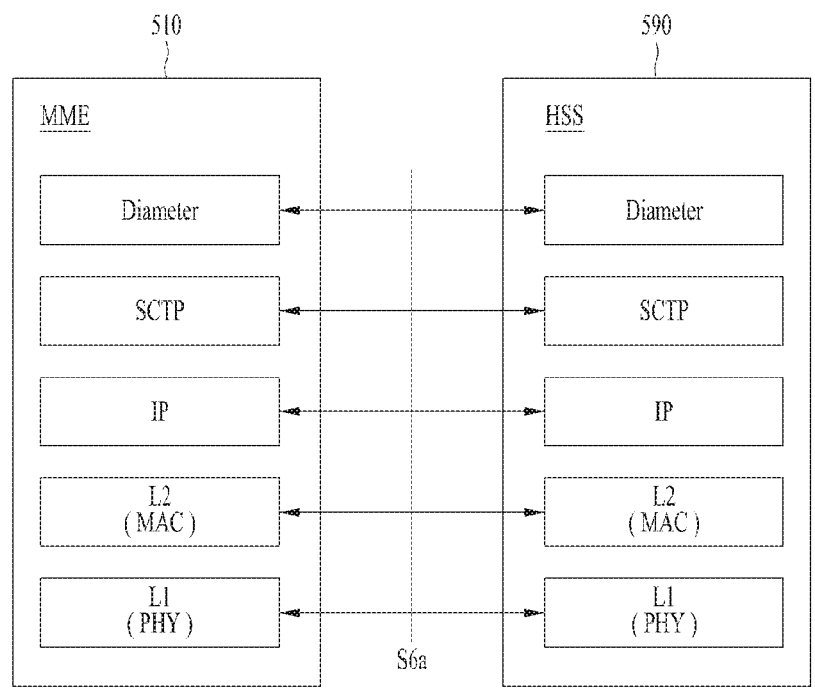
FIG. 9 is a diagram of a protocol stack between an MME 510 and an HSS 590.

FIG. 7 is a diagram of a process that a UE is attaching, i.e., accessing a network, FIG. 8 is a diagram of a protocol stack between a UE 100, a Home (e)Node B 300, and an MME 510, and FIG. 9 is a diagram of a protocol stack between an MME 510 and an HSS 590.

1) First of all, a UE 100 transmits an Attach Request message to the Home (e)Node B 300.

The Attach Request message is a message transmitted by the UE when a first attach is performed such as power of the UE is turned on, a roaming is performed, or a handover is performed.

2) By doing so, the Home (e)Node B 300 receives the Attach Request message and can transmit the received Attach Request message to the MME 510.

In this case, as depicted in FIG. 8, the Attach Request message transmitted to the MME 510 is delivered via an S1-AP protocol in the S1-MME interface.

3) Subsequently, the UE 100 performs an authentication procedure to the HSS 550.

4) The MME 510 makes a request for an update for a position of the UE 100 to the HSS 550 if necessary [S103]. And, the MME 510 receives a position update response message.

In this case, the position update response message includes subscriber information of the UE 100.

In this case, as depicted in FIG. 9, the subscriber information is received via the S6a interface and the subscriber information is received via a diameter protocol.

5~6) The MME 510 configures a tunnel with the S-GW 520 and the P-GW 530. Specifically, the MME 510 transmits a session generation request message, e.g., a Create Session Request message to the S-GW 520. And then, the S-GW 520 transmits the received Create Session Request message to the P-GW 530.

7) The P-GW 530 selectively performs a PCRF interaction procedure with the PCRF 540. In this case, the P-GW 530 can obtain a network service provider policy via the PCRF interaction procedure.

8~9) The P-GW 530 transmits a bearer generation response message, e.g., a Create Session Response message to the S-GW 520. By doing so, a tunnel, e.g., a session is generated between the S-GW 520 and the P-GW 530 and then, the S-GW 520 and the P-GW 530 exchanges a TEID with each other to deliver a data. The TEID is a parameter playing a role of an address used for transmitting and receiving a data. In this case, the Create Session Response message may include the aforementioned network service provider policy. Meanwhile, in case that the P-GW 530 includes a download data to be transmitted to the UE 100, the P-GW can deliver the data to the S-GW 520 via the generated bearer.

The S-GW 520 delivers the session generation response message, e.g., the Create Session Response message to the MME 510. In this case, the Create Session Response message includes the TEID of the S-GW.

10) The MME 510 transmits an attach approval message, e.g., an Attach Accept message to the Home (e)Node B 300 in a manner of including the Attach Accept message in an S1-AP based-initial context setup message, e.g., Initial Context Setup message.

The Attach accept message triggers a radio bearer setup between the Home (e)Node B 300 and the UE 100.

In this case, as depicted in FIG. 8, the Attach accept message is delivered via the S1-AP protocol in the S1-MME interface.

11) The Home (e)Node B 300 and the UE 100 perform an RRC connection procedure.

12) The Home (e)Node B 300 transmits an initial context setup response message to the MME 510.

13) The UE 100 transmits an attach completion message, e.g., an Attach Complete message to the Home (e)Node B 300.

14) The Home (e)Node B 300 transmits the attach completion message, e.g., the Attach Complete message to the MME 510. By doing so, a tunnel is set between the UE 100 and the S-GW 520. The Attach Complete message includes the TEID of the Home (e)Node B 300. By doing so, the UE 100 can transmit an uplink data of the UE to the S-GW 520 via the Home (e)Node B 300.

15~18) Meanwhile, the MME 510 transmits a bearer modification request message, e.g., a Modify Bearer Request message to the S-GW 520 for the set session, i.e., for a modification of the bearer. The Modify Bearer Request message includes the TEID of the Home (e)Node B 300. The S-GW 520 transmits the Modify Bearer Request message to the P-GW 530. The P-GW 530 transmits a response message, e.g., an Update Bearer Response message. And then, the S-GW 520 transmits the Update Bearer Response message to the MME 520. If the set bearer is updated via the aforementioned procedures, the S-GW 520 transmits a downlink data to the UE 100 via the Home (e)Node B 300.

19) If it is necessary to store an APN, a PDN GW id, and the like in the HSS to move to a non-3GPP access as necessary, a process of registering in the HSS 590 is performed via a Notify Request message.

Figure 10:
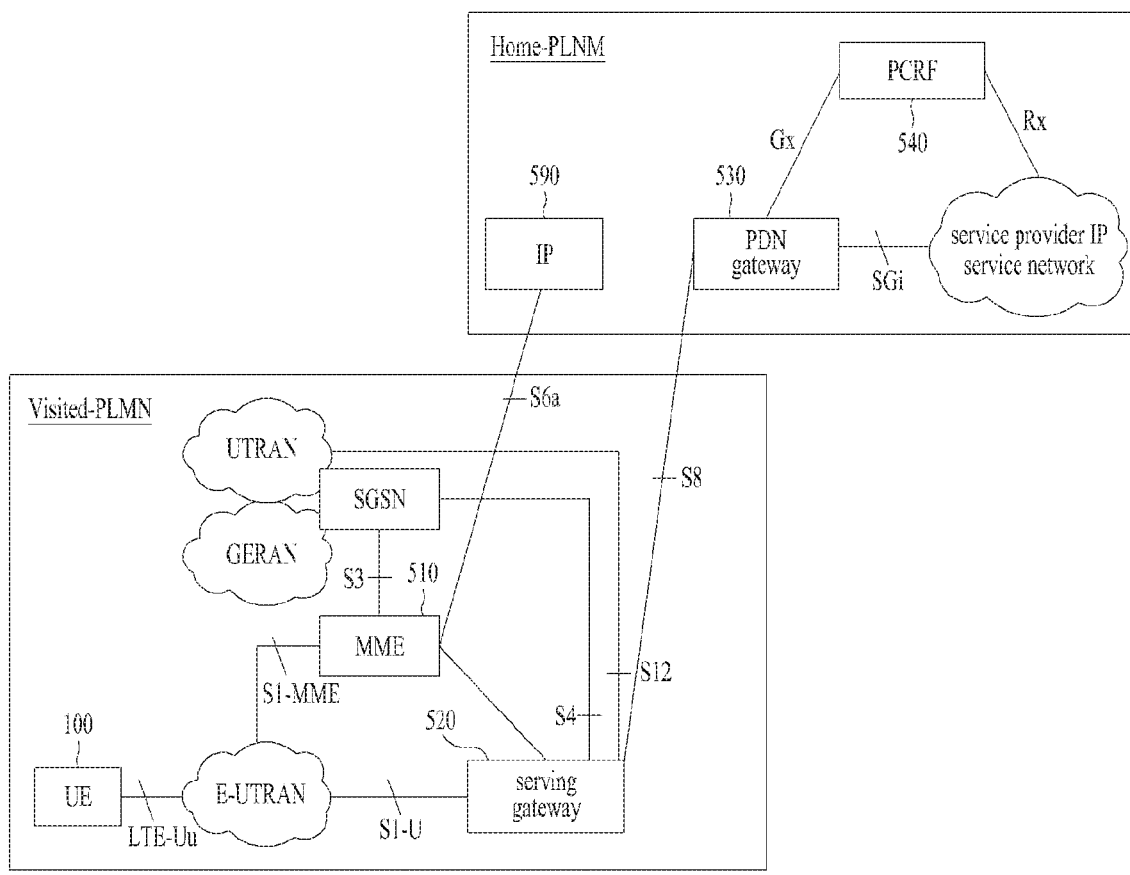
FIG. 10 is a diagram of an interface in a scenario of which a data of a user plane stops over in a home network in case that a UE intends to continuously use a service of a service provider in the home network although the UE has roamed to a visited network.

FIG. 10 is a diagram of an interface in a scenario of which a data of a user plane stops over in a home network in case that a UE intends to continuously use a service of a service provider in the home network although the UE has roamed to a visited network. In the following description, it is explained in a manner of mainly concerning an interface different from FIG. 6.

S8: it is an interface providing a user plane and a control plane between a serving gateway in a visited network, i.e., a visited-PLMN and a PDN gateway in a home network, i.e., Home-PLMN.

FIG. 11 is a diagram of an interface in a scenario of which a data of a user plane stops over in a home network in case that a UE intends to continuously use a service of a service provider in the home network although the UE has roamed to a visited network.

Specifically, FIG. 11(*a*) and FIG. 11(*b*) are depicted in a manner of being divided according to whether an application function is in a home network or a visited network. In this case, a data of a user plane is identically transmitted to a UE not from the home network but from the visited network in both cases.

In the following description, it is explained in a manner of mainly concerning an interface different from FIG. 6 and FIG. 10.

S9: it is an interface to exchange a policy and charging control information between a Home-PCRF and a Visited-PCRF.

Rx: it is an interface between an application function (AF) and a PCRF.

As depicted in FIG. 10 and FIG. 11, in case that the UE 100 roams to the visited network, the MME 510 in the visited network should obtain subscriber information from an HSS 590 in the home network of the UE 100. CSG-related information may be included in the subscriber information. In this case, in case that the Home (e)Node B 300 operates in a CSG (closed subscriber group) mode, if the UE 100 performs an attach or a position update process, the MME 510 can determine whether to accept the attach or the position update process or not using the obtained CSG information.

By the way, there may occur some problems here.

For instance, LTE and EPC have technologies slightly different from each other according to a release version of them. A service provider may set up communication equipments different from each other in terms of the release version in a course of installing LTE and EPC equipments according to the service provider. Hence, a part of the subscriber information obtained from the HSS 590 in the home network may not be compatible with the visited network.

Specifically, for instance, in case that the home network of a release version Rel-7 does not support a CSG service whereas the visited network supports the CSG service, if a UE, which is the subscriber of the home network, roams to the visited network, since the HSS in the home network has no CSG-related information, the UE cannot receive a CSG-related service from the visited network. In particular, assume that a first service provider has established a Rel-7 network at some point and a second service provider concluded a roaming agreement with the first service provider has established a Rel-8 network. Then, when the UE, which is the subscriber of the first service provider, roams to the network of the second service provider, the UE cannot receive the CSG service in the network of the second service provider. Although the CSG service is probably provided to such an enterprise network as the Starbucks, a shopping mall, and the like, there is no chance to receive useful services capable of being opened to a roaming subscriber.

Meanwhile, assume that the first service provider and the second service provider have a separate agreement for a CSG service for a roaming UE (called VCSG) to solve the aforementioned problem. In this case, if the roaming UE 100 performs an attach or a position update process, the MME 510 in the visited network obtains subscriber information of the roaming UE 100 from the HSS 590 in the home network and will obtain CSG-related information due to the agreement from the visited network.

Yet, the CSG-related information obtained from the HSS in the home network and the CSG-related information in the visited network are different from each other, the MME 510 cannot properly provide the CSG service to the roaming UE. For instance, if the information included in the subscriber information obtained from the HSS of the home network says there is a membership for CSG ID 1, 3, and 4 whereas the CSG-related information obtained from the visited network says there is a membership for CSG ID 2, 4, and 5, the MME 510 cannot know the membership of which the roaming UE actually has for the CSG ID. As a different example, in case that a corresponding UE roams to the visited network immediately after a membership for a specific CSG ID is expired in the home network, the corresponding membership may not be expired in the visited network yet. In this case, the MME 510 cannot judge whether the CSG service is provided or not for the roaming UE.

Meanwhile, as mentioned in the foregoing description, in case that the CSG-related information is not obtained from the HSS in the home network, the CSG service may not be provided in the visited network. For instance, if the MME in the visited network receives the Attach Request message, the MME obtains subscriber information from the HSS in the home network. If there is no CSG-related information in the subscriber information, the MME informs the roaming UE of an attach denial.

Yet, since accessing the Home (e)Node B in the visited network by the UE is a method of reducing the overhead of a macro base station, i.e., (e)Node B, it may be effective to provide the CSG service in a manner of autonomously managing CSG membership in the visited network.

Yet, this is only applied to a case that the CSG service is provided in a manner of autonomously managing CSG membership in the visited network when the CSG-related information is not obtained from the HSS in the home network.

Unlike the above situation, in case that there is a conflict between the CSG-related information autonomously managed in the visited network although the CSG-related information is obtained from the HSS in the home network, the aforementioned problem is still not possible to solve.

In particular, for instance, after the MME 510 in the visited network received the Attach request message from the roaming UE, if there is a conflict between the CSG-related information (random CSG ID1, valid expiration-date) in the subscriber information obtained from the HSS in the home network and the CSG-related information (random CSG ID1, invalid expiration-date) autonomously managed in the visited network, the MME 510 cannot properly process the request.

Hence, methods of solving the aforementioned problem are proposed in the following description.

If it is simply explained the method of solving the problem, the MME 510 in the visited network determines whether the roaming UE is able to access the Home (e)Node B operating in the CSG mode using one of information described in the following.

- information on whether a home network, i.e., H-PLMN allows a VCSG function
- CSG information (CSG ID and expiration date) allowed by the home network, i.e., H-PLMN
- CSG information (CSG ID and expiration date) allowed by the visited network, i.e., V-PLMN
- In case of receiving CSG-related information from both the home network, i.e., H-PLMN and the visited network, i.e., V-PLMN, in particular,
- in case that there is a conflict between two information, information on priority of the CSG information
  - Information on a level of allowance of the home network, i.e., H-PLMN for a VCSG function (range of allowance) (for instance, allow in a range of not conflicting with HPLMN information only or allow based on a local CSG-related information in the visited network only)
  - Information on granularity where the VCSG function is allowed by home network, i.e., HPLMN, for instance, a subscriber/UE of a specific group
  - Other general roaming agreement information
  - Information on a service provider policy of a home network, a service provider policy of a visited network, or a policy of a Home (e)Node B operator (this is stored in the MME in a pre-configuration form or can be received from H(e)NB/H(e)NB GW)

The methods of solving the problem are explained with reference to drawing in the following description.

Figure 12:
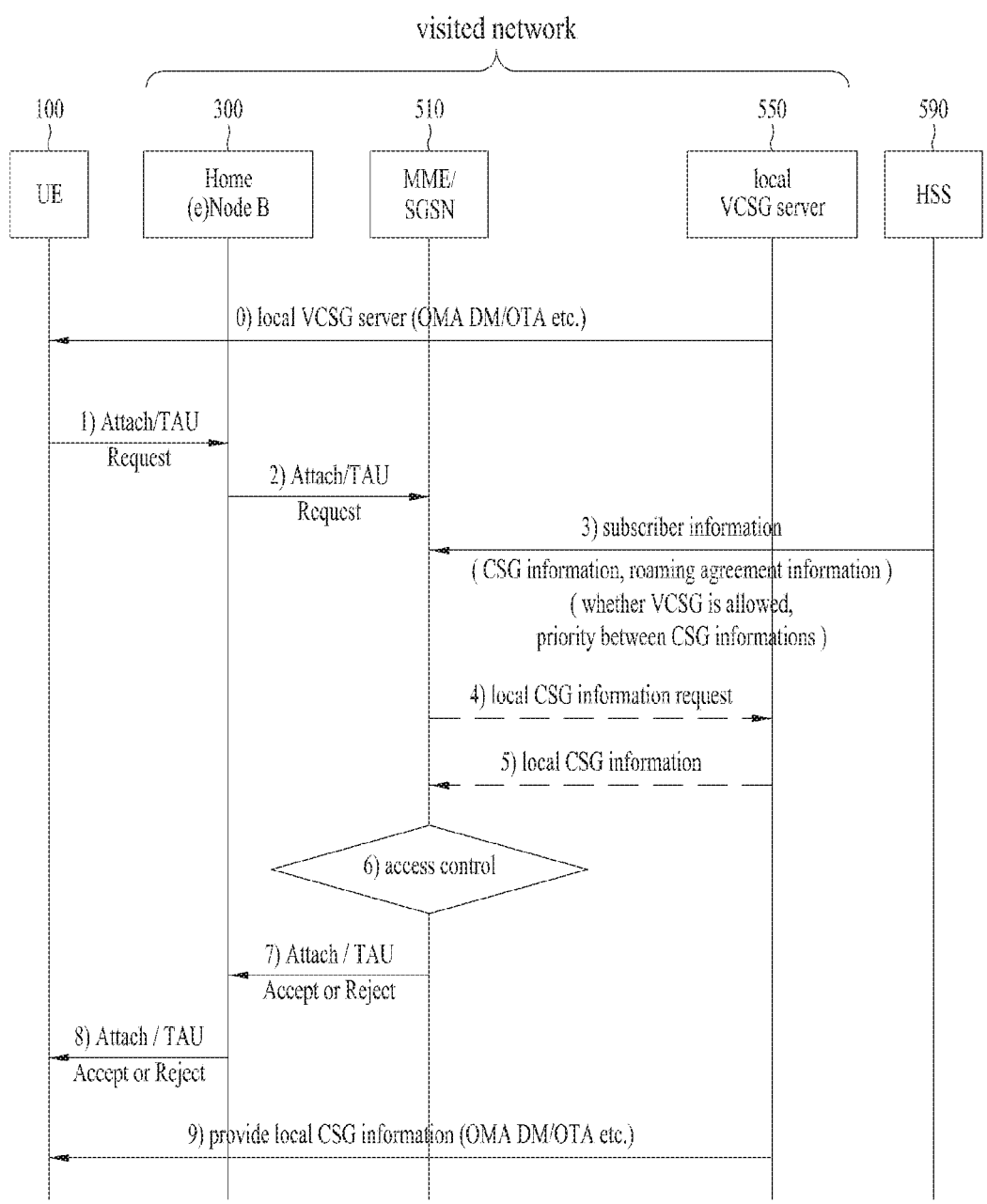
FIG. 12 is a diagram of a procedure of a UE roamed to a visited network according to one embodiment.

FIG. 12 is a diagram of a procedure of a UE roamed to a visited network according to one embodiment.

Referring to FIG. 12, FIG. 12 indicates an HSS 590 in a home network of a roaming UE 100 and a Home (e)Node B 300 and an MME 510 in a visited network.

And, FIG. 12 indicates that a local VCSG server 550 is included in the visited network. The local VCSG server 550 autonomously manages a CSG membership in the visited network. The local VCSG server 550 can solely exist in the visited network or may be included in an HSS/HLR in the visited network. Or, the local VCSG server 550 can be included in a different node in the visited network.

0) Aside from the Attach request or a TAU request process of the UE 100, the local VCSG server 550 can transmit local CSG-related information to the UE 100. For instance, the local VCSG server can deliver the CSG-related information using an OMA DM scheme or an OTA scheme.

The local CSG-related information can include at least one selected from the group consisting of the information in the following.

TABLE 1

CSG information (CSG ID, expiration date, and the like) allowed (provided) by the visited network, i.e., V-PLMN
Information on a level of allowance of the home network, i.e., H-PLMN for a VCSG function (range of allowance) (for instance, allow in a range of not conflicting with HPLMN information only or allow a use of all local CSG information)
Information on granularity where the VCSG function is allowed by home network, i.e., HPLMN, for instance, a subscriber/UE of a specific group And, the local VCSG server 550 can provide information on priority, e.g., VPLMN-VCSG-configuration information to the UE 100 for a case that there is discord between the CSG-related information obtained from the HSS of the local VCSG server 550 in the visited network and the local CSG-related information. The information on priority, e.g., the information on the VPLMN-VCSG-configuration information shall be described later.

1) First of all, the UE 100 transmits an Attach Request message or a tracking Area Update (TAU) message to the Home (e)Node B 300. The Attach request message is a message transmitted by the UE when attach is initially performed such as power of the UE is turned on, a roaming is performed, or a handover is performed. The Attach Request message or the TAU message can include at least one of a local CSG-related information obtained by the UE, CSG-related information (in particular, the information previously received from the local VCSG server by the UE or comprehensive CSG information without dividing into the information received from the Home network and the information received from the visited network) in the home network (i.e., HPLMN), and the information on priority. 2) Then, the Home (e)node B 300 receives the Attach request message and can transmit the received Attach request message to the MME 510.

3) The MME 510 in the visited network obtains subscriber information of the UE from the HSS 590 in the home network. The subscriber information can include roaming agreement information as well as the CSG-related information. The roaming agreement information can include at least one of the information described in the following.

TABLE 2 information on whether a home network, i.e., H-PLMN allows a VCSG function: it is possible to deliver a direct indication or information of a implicative form
CSG information (CSG ID, expiration date, and the like) allowed by the home network, i.e., H-PLMN
In case of receiving CSG-related information from both the home network, i.e., H-PLMN and the visited network, i.e., V-PLMN, in particular, in case that there is a conflict between two TABLE 2-continued information, information on priority of the CSG information: for instance, always HPLMN information first, always VPLMN information first, short expiration date first, long expiration date first, and the like
Information on a level of allowance of the home network, i.e., H-PLMN for a VCSG function (range of allowance) (for instance, allow in a range of not conflicting with HPLMN information only or allow based on a local CSG-related information in the visited network only)
Information on granularity where the VCSG function is allowed by home network, i.e., HPLMN, for instance, a subscriber/UE of a specific group
Other general roaming agreement information
Information on a service provider policy of a home network, a service provider policy of a visited network, or a policy of a Home (e)Node B operator (this is stored in the MME in a pre-configuration form or can be received from H(e)NB/H(e)NB GW)

4~5) Meanwhile, the MME 510 can access the local VCSG server 550 to check whether there is an update for the local CSG-related information included in the Attach Request message.

6) Meanwhile, the MME 510 performs an access control in response to the Attach Request of the roaming UE based on the informations obtained according to the aforementioned contents. The information obtained according to the aforementioned content is described in the following to help understand the information.

CSG subscription information information on access mode of the Home (e)Node B: one of an open access mode, a closed access mode, and a hybrid access mode information on whether the HPLMN allows the VCSG function (on/off): it is possible to deliver a direct indication or information of a implicative form information on CSG information (CSG ID, expiration date, etc.) allowed by the VPLMN in case that the CSG information of both the HPLMN and the VPLMN is valid, in particular, there is a contention between two informations, information on priority between CSG information information on a level of allowance of the home network, i.e., H-PLMN for a VCSG function Information on granularity where the VCSG function is allowed by home network, i.e., HPLMN, for instance, a subscriber/UE of a specific group information on other general roaming agreement information on other (Home or Visited) service provider policy or a policy of H(e)NB owner, etc. As mentioned in the foregoing description, if there is discord between the CSG-related information obtained from the HSS and the local CSG-related information, the MME performs access control based on the priority information, e.g., VPLMN-VCSG-configuration information.

In particular, if there is a contention between obtained information, the MME 510 performs the access control in a manner of giving priority to the CSG information included in the subscriber information received from the Home network (HPLMN) or giving priority to the local CSG information defined in the visited network (VPLMN) according to the priority information, e.g., VPLMN-VCSG-configuration information.

Alternatively, if there is a contention between obtained information, the MME 510 can perform the access control according to the information on the priority defined in the CSG-related information received from the HSS 590. Alternatively, if there is a contention between obtained information, the MME 510 can perform the access control according to the information on the priority defined in the local CSG-related information.

7) According to a result of performing the access control, the MME 510 can transmit a message for accepting the Attach request/TAU request, e.g., an Attach Accept/TAU Accept message or a message for rejecting the Attach request/TAU request, e.g., an Attach Reject/TAU reject message to the Home (e)Node B 300.

8) By doing so, the Home (e)node B 300 transmits the received message to the UE 100.

9) Meanwhile, aside from the Attach Request or the TAU request process of the UE 100, the local VCSG server 550 can transmit CSG-related information to the UE 100. For instance, the local VCSG server can deliver the information using an OMA DM scheme or an OTA scheme.

Figure 13:
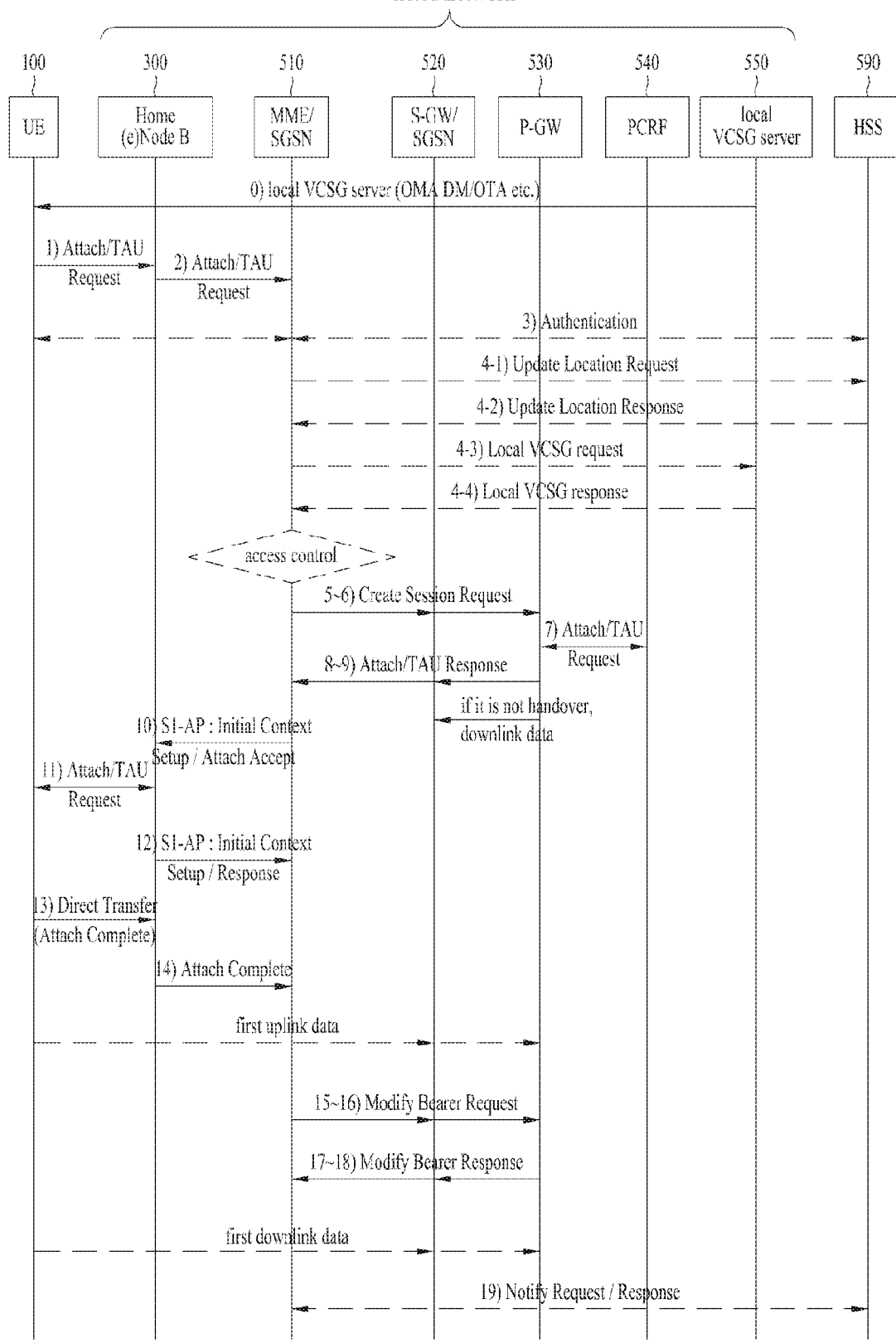
FIG. 13 is a diagram of a more detail procedure of the procedure depicted in FIG. 12.

FIG. 13 is a diagram of a more detail procedure of the procedure depicted in FIG. 12.

10) Aside from the Attach Request or the TAU request process of the UE 100, the local VCSG server 550 can transmit CSG-related information to the UE 100. For instance, the local VCSG server can deliver the information using an OMA DM scheme or an OTA scheme.

The local CSG-related information may include at least one of the information described in the following description.

TABLE 3

CSG information (CSG ID, expiration date, and the like) allowed (provided) by the visited network, i.e., VPLMN
Information on a level of allowance of the home network, i.e., HPLMN for a VCSG function (range of allowance) (for instance, allow in a range of not conflicting with HPLMN information only or allow a use of all local CSG information)
Information on granularity where the VCSG function is allowed by home network, i.e., HPLMN, for instance, a subscriber/UE of a specific group And, the local VCSG server 550 can provide information on priority, e.g., VPLMN-VCSG-configuration information to the UE 100 for a case that there is discord between the CSG-related information obtained from the HSS of the local VCSG server 550 in the visited network and the local CSG-related information.

The VPLMN-VCSG-configuration information can include information described in the following description.

TABLE 4 a) permission = VCSG-ALLOWED, NOT-VCSG-ALLOWED, or VCSG-PART-ALLOWED,
VCSG-ALLOWED: indicates that a use of a VCSG function is allowed in a corresponding

TABLE 4-continued visited network, i.e., VPLMN. NOT-VCSG-ALLOWED: indicates that a use of a VCSG function is not allowed in a corresponding visited network. VCSG-PART-ALLOWED: if a granularity using the VCSG function is not a PLMN unit, indicates that the VCSG function is allowed to a specific list or a specific user only. b) granularity = all VPLMN, specific CSG list(s), or specific user(s): display a unit to which the VCSG function is applied c) Action type = static or dynamic - if discord occurs between VCSG informations received from a home network (HPLMN) and a visited network (VPLMN), displays whether a reference of judgment of the MME is statically preconfigured or can be dynamically modified d) Action = HPLMN info first, VPLMN info first, or expiration time first - in case that discord occurs between VCSG informations received from a home network (HPLMN) and a visited network (VPLMN), if the reference of judgment of the MME can be dynamically determined, many actions described in the following can be indicated. - HPLMN info first: the MME performs an evaluation job on the basis of the CSG information included in the subscriber information received from the home network (HPLMN). - VPLMN info first: the MME performs an evaluation job on the basis of the information received from the local VCSG server of the visited network (VPLMN). - expiration time first: the MME performs an evaluation job on the basis of the expiration time ended first or the expiration time remaining a lot irrespective of where the information came from.

1) The UE 100 transmits the Attach Request message to the Home (e)Node B 300.

The Attach request message is a message transmitted by the UE when attach is initially performed such as power of the UE is turned on, a roaming is performed, or a handover is performed. The Attach Request message or the TAU message can include at least one of a local CSG-related information obtained by the UE, CSG-related information (in particular, the information previously received from the local VCSG server by the UE or comprehensive CSG information without dividing into the information received from the Home network and the information received from the visited network) in the home network (i.e., HPLMN), and the information on priority.

2) Then, the Home (e)node B 300 receives the Attach request message and can transmit the received Attach request message to the MME 510.

And then, the Home (e)Node B 300 can transmit the received Attach Request message to the MME 510 in a manner of including configuration information of the Home (e)Node B, specifically, a normal configuration information and an access mode information (an open access mode, a closed access mode, a hybrid access mode) in the Attach Request message. As mentioned in the foregoing description, to obtain the access mode information by the MME 510 in a manner that the Home (e)Node B 300 transmits the access mode by including the access mode information in the Attach request message is called a directly obtaining method. On the other hand, the MME 510 can obtain the access mode information via an indirectly obtaining method as well.

Meanwhile, as depicted in FIG. 8, the Attach Request message transmitted to the MME 510 is delivered via the S1-AP protocol in the S1-MME interface.

3) Subsequently, the UE 100 performs an authentication procedure to the HSS 550.

4) The MME 510 makes a request for an update for a position of the UE 100 to the HSS 550 if necessary. And, the MME 510 receives a position update response message. In this case, the position update response message includes subscriber information of the UE 100.

In this case, as depicted in FIG. 9, the subscriber information is received via the S6a interface and the subscriber information is received via a diameter protocol.

The subscriber information can include at least one of CSG-related information and roaming agreement information.

The CSG-related information can include information on CSG ID and expiration time.

The roaming agreement information can include at least one of the information described in the following.

TABLE 5

Information on whether a home network, i.e., H-PLMN allows a VCSG function: it is possible to deliver a direct indication or information of a implicative form
CSG information (CSG ID, expiration date, and the like) allowed by the home network, i.e., H-PLMN
In case of receiving CSG-related information from both the home network, i.e., H-PLMN and the visited network, i.e., V-PLMN, in particular, in case that there is a conflict between two information, information on priority of the CSG information: for instance, always HPLMN information first, always VPLMN information first, short expiration date first, long expiration date first, and the like
Information on a level of allowance of the home network, i.e., H-PLMN for a VCSG function (range of allowance) (for instance, allow in a range of not conflicting with HPLMN information only or allow based on a local CSG-related information in the visited network only)
Information on granularity where the VCSG function is allowed by home network, i.e., HPLMN, for instance, a subscriber/UE of a specific group
Other general roaming agreement information
Information on a service provider policy of a home network, a service provider policy of a visited network, or a policy of a Home (e)Node B operator (this is stored in the MME in a pre-configuration form or can be received from H(e)NB/H(e)NB GW)

The position update response message received from the HSS 550 may include the aforementioned priority information, e.g., VPLMN-VCSG-configuration.

Meanwhile, the MME 510 can access the local VCSG server 550 to check whether there is an update for the local CSG-related information included in the Attach Request message.

The MME 510 performs an access control in response to the Attach request of the roaming UE based on the informations obtained according to the aforementioned content. The access control can be performed prior to the update check of the local CSG-related information for the local VCSG server 550.

According to a result of performing the access control, the MME 510 can accept or reject the Attach request/TAU request.

In particular, in case that the UE 100 accesses the Home (e)node B 300 operating in the CSG mode, the MME 510 can perform the access control based on the CSG-related information in the subscriber information received from the HSS 590, the access mode information of the Home (e)Node B 300, and the local CSG information.

In this case, if there is a contention between obtained information, the MME 510 can perform the access control according to the content included in the aforementioned priority information, e.g., VPLMN-VCSG-configuration.

In particular, if there is a contention between obtained information, the MME 510 performs the access control in a manner of giving priority to the CSG information included in the subscriber information received from the Home network (HPLMN) or giving priority to the local CSG information received from the visited network (VPLMN) according to the priority information, e.g., VPLMN-VCSG-configuration information.

Alternatively, if there is a contention between obtained information, the MME 510 can perform the access control according to the information on the priority defined in the CSG-related information received from the HSS 590. Alternatively, if there is a contention between obtained information, the MME 510 can perform the access control according to the information on the priority defined in the local CSG-related information.

Meanwhile, if it is judged based on the access mode information that the Home (e)Node B operates in the hybrid access mode and the UE 100 does not have CSG membership, the MME 510 accepts the access of the UE 100 and may provide a differentiated service quality.

5~6) If the MME 510 accepts the Attach Request/TAU request according to the result of performing the access control, the MME 510 configures a tunnel with the S-GW 520 and the P-GW 530. Specifically, the MME 510 transmits a session generation request message, e.g., a Create Session Request message to the S-GW 520. And then, the S-GW 520 transmits the received Create Session Request message to the P-GW 530.

7) The P-GW 530 selectively performs a PCRF interaction procedure with the PCRF 540. In this case, the P-GW 530 can obtain a network service provider policy via the PCRF interaction procedure. In this case, the PCRF may store the priority information, e.g., VPLMN-VCSG-configuration. Hence, the P-GW 530 can obtain the priority information via the PCRF interaction procedure.

8~9) The P-GW 530 transmits a bearer generation response message, e.g., a Create Session Response message to the S-GW 520. By doing so, a tunnel, e.g., a session is generated between the S-GW 520 and the P-GW 530 and then, the S-GW 520 and the P-GW 530 exchanges a TEID with each other to deliver a data. The TEID is a parameter playing a role of an address used for transmitting and receiving a data. In this case, the Create Session Response message may include the aforementioned network service provider policy. And, if the P-GW 530 obtains the priority information via the PCRF interaction procedure, the Create Session Response message may include the priority information.

Meanwhile, in case that the P-GW 530 includes a download data to be transmitted to the UE 100, the P-GW can deliver the data to the S-GW 520 via the generated bearer.

The S-GW 520 delivers the session generation response message, e.g., the Create Session Response message to the MME 510. In this case, the Create Session Response message includes the TEID of the S-GW. In this case, as mentioned earlier, the Create Session Response message may include the priority information.

10) If the MME 510 does not perform the access control in the aforementioned process, the MME can perform the access control after receiving the Create Session Response message from the S-GW 520. In this case, if the priority information is included in the Create Session Response message, the access control can be performed according to the priority information for the discord between the CSG-related informations.

The MME 510 transmits an attach approval message, e.g., an Attach Accept message to the Home (e)Node B 300 in a manner of including the Attach Accept message in an S1-AP based-initial context setup message, e.g., Initial Context Setup message.

In this case, as depicted in FIG. 8, the Attach accept message is delivered via the S1-AP protocol in the S1-MME interface.

The Attach accept message triggers a radio bearer setup between the Home (e)Node B 300 and the UE 100.

The Attach accept message can include a result of the access control. The result of the access control may include connection type information. The connection type information may include one of two informations described in Table 6.

TABLE 6

(1) Accept as a CSG member: in case that the Home (e)Node B operates in the closed access mode or the hybrid access mode and a UE making a request for an access is a CSG member serviceable by the corresponding Home (e)Node B, it indicates that the corresponding UE is accepted as the CSG member. (2)) Accept as a non-CSG member: in case that the Home (e)Node B operates in the hybrid access mode and a UE making a request for an access is not a CSG member serviceable by the corresponding Home (e)Node B, it indicates that the UE making a request for the access is accepted as the non-CSG member.

11) The Home (e)Node B 300 and the UE 100 perform an RRC connection procedure.

12) The Home (e)Node B 300 transmits an initial context setup response message to the MME 510.

13) The UE 100 transmits an attach completion message, e.g., an Attach Complete message to the Home (e)Node B 300.

14) The Home (e)Node B 300 transmits the attach completion message, e.g., the Attach Complete message to the MME 510. By doing so, a tunnel is set between the UE 100 and the S-GW 520. The Attach Complete message includes the TEID of the Home (e)Node B 300. By doing so, the UE 100 can transmit an uplink data of the UE to the S-GW 520 via the Home (e)Node B 300.

15) Meanwhile, the MME 510 may perform the aforementioned access control after receiving the attach completion message, e.g., the Attach Complete message.

15~18) Meanwhile, the MME 510 transmits a bearer modification request message, e.g., a Modify Bearer Request message to the S-GW 520 for the set session, i.e., for a modification of the bearer. The Modify Bearer Request message includes the TEID of the Home (e)Node B 300. The S-GW 520 transmits the Modify Bearer Request message to the P-GW 530. The P-GW 530 transmits a response message, e.g., an Update Bearer Response message. And then, the S-GW 520 transmits the Update Bearer Response message to the MME 520. If the set bearer is updated via the aforementioned procedures, the S-GW 520 transmits a downlink data to the UE 100 via the Home (e)Node B 300.

19) If it is necessary to store an APN, a PDN GW id, and the like in the HSS to move to a non-3GPP access as necessary, a process of registering in the HSS 590 is performed via a Notify Request message.

Meanwhile, the Home (e)Node B 300 provide a service to the UE 100.

Specifically, the Home (e)Node B 300 performs such a 'Radio Resource Control function' as a Rate Control, diversification of connection establishment, and the like. For instance, if the resource of the Home (e)Node B is not sufficient, the Home (e)Node B 300 can configure QoS of the UE corresponding to a non-CSG member lower than the QoS of the UE corresponding to a CSG member. And, in case of scheduling a data, the Home (e)Node B 300 can configure the priority of the data to be transmitted to the UE corresponding to the non-CSG member to be low. Or, if the Home (e)Node B is not able to provide a service to the UE anymore such that the CSG membership of the UE 100 is expired or cancelled, the Home (e)node B can make the UE 100 perform a handover to a different Home (e)Node B cell (i.e., different CSG cell) or an (e)Node B cell (or, a non-CSG cell) in charge of a macro cell.

Or, if the Home (e)Node B is not able to provide a service to the UE anymore due to a lack of a radio resource and the like, the Home (e)Node B can make a CSG member perform a handover to a different Home (e)Node B cell (i.e., different CSG cell) or an (e)Node B cell (or, a non-CSG cell) in charge of a macro cell instead of terminating the service.

As mentioned in the foregoing description, FIG. 13 describes the MME 510 and the S-GW 520 on the basis of the EPC. Yet, the concept of the present invention can be applied to UMTS. In case of UMTS, both the MME 510 and the S-GW 520 can be integrated into the SGSN. Hence, signal transmission and reception between the MME 510 and the S-GW 520 depicted in FIG. 7 is not performed. Instead, the signal transmission and the reception can be processed in the inside of the SGSN.

Figure 14:
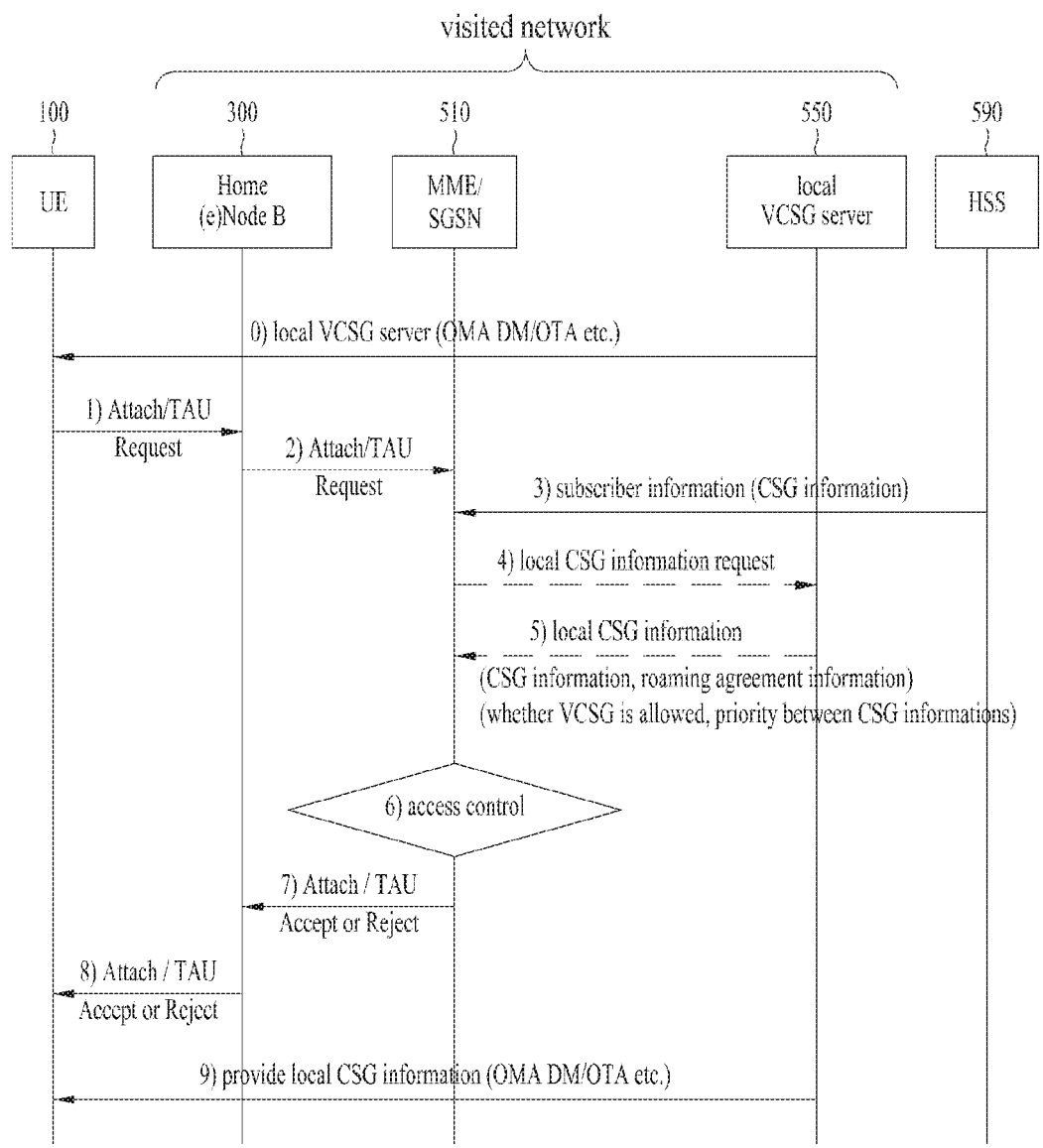
FIG. 14 is a diagram of a procedure of a UE roamed to a visited network according to a different embodiment.

FIG. 14 is a diagram of a procedure of a UE roamed to a visited network according to a different embodiment.

Referring to FIG. 14, unlike FIG. 12, the MME 510 obtains CSG information only from the HSS 590 in the home network and does not obtain roaming agreement information and information on whether VCSG is allowed. The roaming agreement information and the information on whether VCSG is allowed are predefined in the local VCSG server 550. If it is judged that the UR performed a roaming, the MME 510 obtains the information from the local VCSG server 550. In this case, according to the roaming agreement information and the information on whether VCSG is allowed, if a CSG service for the UE is not allowed, the local VCSG server 590 does not deliver the roaming agreement information and the information on whether VCSG is allowed to the MME 510 and just informs the MME that the CSG service is not allowed.

Since other items depicted in FIG. 14 are similar to FIG. 12, those skilled in the art can easily identify the items from explanation of FIG. 12. Hence, the explanation of FIG. 12 is applied to here and it is not repeatedly explained.

Figure 15:
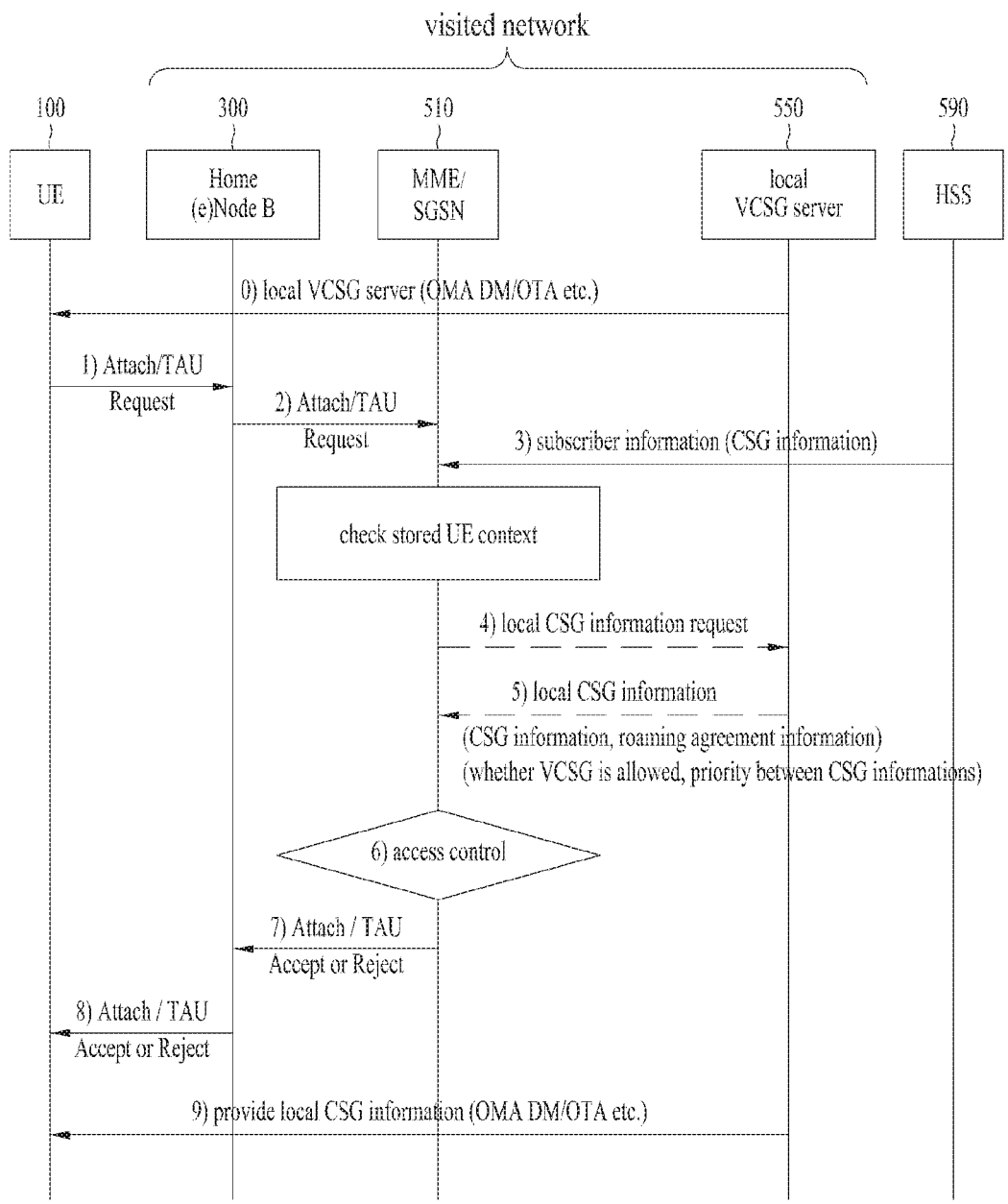
FIG. 15 is a diagram of a procedure of a UE roamed to a visited network according to a different embodiment.

FIG. 15 is a diagram of a procedure of a UE roamed to a visited network according to a different embodiment.

Referring to FIG. 15, unlike FIG. 12 and FIG. 14, the MME 510 stores in advance at least one of the information on whether VCSG is allowed and the local CSG information. For instance, in case that the MME 510 stores the information, it correspond to a case that the UE 100 has accessed the visited network before. In this case, the MME 510 includes a context related to the UE and the context may include at least one of the information on whether VCSG is allowed and the local CSG information.

In this case, if the UE 100 performs an Attach Request or a TAU request in a manner of revisiting the visited network, the MME 510 can reuse at least one of the information on whether VCSG is allowed and the local CSG information or can access the local CSG server 550 to check whether there is a recent update. If there exist a recent update or expiration date for the stored information is expired, the MME can obtain the updated information from the local CSG server.

Since other items depicted in FIG. 15 are similar to FIG. 12 and FIG. 14, those skilled in the art can easily identify the items from explanation of FIG. 12. Hence, the explanation of FIG. 12 is applied to here and it is not repeatedly explained.

Figure 16:
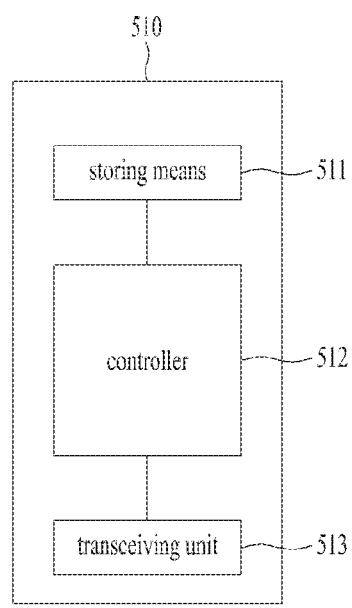
FIG. 16 is a block diagram of an MME 510 according to the present invention.

Meanwhile, unlike the aforementioned explanation, if there is discord between the local CSG information and the CSG-related information obtained from the HSS in the home network, the MME 510 may store the information on the priority between the informations in advance instead of delivering the information on the priority between the informations to the MME 510. FIG. 16 is a block diagram of an MME 510 according to the present invention.

As depicted in FIG. 16, the MME 510 includes a storing means 511, a controller 512, and a transceiving unit 513.

The storing means 511 is configured to store the method depicted in FIG. 4 to FIG. 15.

The controller 512 is configured to control the storing means and the transceiving unit.

Specifically, the controllers are configured to execute the methods stored in the storing means, respectively. And, the controller is configured to transmit the aforementioned signals via the transceiving module.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents. And, it is apparently understandable that an embodiment is configured by combining claims failing to have relation of explicit citation in the appended claims together or can be included as new claims by amendment after filing an application.

What is claimed is:

1. A method of controlling an access, which is controlled by a Mobility Management Entity (MME) of a control plane in a visited network, the method comprising:
receiving, by the MME, an access request message or an update request message from a Home (e)Node B;
identifying, by the MME, confliction between first Closed Subscriber Group (CSG) information and second CSG information when a user equipment (UE) is roaming to the visited network,
wherein the first CSG information is CSG-related information defined in a home network and the second CSG information is CSG-related information in the visited network for the roaming UE;
determining, by the MME, CSG information among the first CSG information and the second CSG information based on predefined priority information,
wherein the predefined priority information indicates that the first CSG information takes precedence over the second CSG information; and
transmitting, by the MME, an accept message based on the determined CSG information to the roaming UE via the Home (e)Node B.

2. The method of claim 1, wherein the priority information includes whether a reference of an access control is static or whether the reference of the access control can be modified into a dynamic reference.

3. The method of claim 2, wherein if an access is allowed, the priority information further includes at least one of information on a level to be allowed and information on a CSG membership in a case of being allowed.

4. The method of claim 1, wherein the first CSG information or the second CSG information includes at least one of a CSG identity (ID) and expiration time information.

5. The method of claim 4, wherein the first CSG information or the second CSG information further includes the priority information.

6. The method of claim 4, wherein the first CSG information and the second CSG information include at least one selected from the group consisting of an information on whether a CSG service is allowed in the visited network, CSG-related information allowed in the visited network, an information on a level of the CSG service allowed in the visited network, and the priority information for a case of discord.

7. The method of claim 1, wherein the priority information is obtained from a server in the visited network storing the second CSG information.

8. The method of claim 1, wherein the priority information is stored in advance in a server in charge.

9. The method of claim 1, wherein the priority information is stored in a PCRF (Policy and Charging Rule Function) server in the visited network.

10. A Mobility Management Entity (MME) of a control plane in a visited network, the MME comprising:
a receiving unit;
a transmitting unit; and
a control unit configured to control the receiving unit and the transmitting unit,
wherein the control unit is further configured to:
control the receiving unit to receive an access request message or an update request message from a Home (e)Node B,
identify confliction between first Closed Subscriber Group (CSG) information and second CSG information when a user equipment (UE) is roaming to the visited network,
wherein the first CSG information is CSG-related information defined in a home network and the second CSG information is CSG-related information in the visited network for the roaming UE,
determine CSG information among the first CSG information and the second CSG information based on predefined priority information,
wherein the predefined priority information indicates that the first CSG information takes precedence over the second CSG information, and
control the transmitting unit to transmit an accept message based on the determined CSG information to the roaming UE via the Home (e)Node B.

* * * * *